US009316502B2

(12) United States Patent
Moore et al.

(10) Patent No.: US 9,316,502 B2
(45) Date of Patent: Apr. 19, 2016

(54) INTELLIGENT MOBILITY AID DEVICE AND METHOD OF NAVIGATING AND PROVIDING ASSISTANCE TO A USER THEREOF

(71) Applicant: Toyota Motor Engineering & Manufacturing North America, Inc., Erlanger, KY (US)

(72) Inventors: Douglas A. Moore, Livermore, CA (US); Joseph M. A. Djugash, San Jose, CA (US); Yasuhiro Ota, Santa Clara, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/338,305

(22) Filed: Jul. 22, 2014

(65) Prior Publication Data

US 2016/0025499 A1    Jan. 28, 2016

(51) Int. Cl.
*G01C 21/16* (2006.01)
*H04N 13/00* (2006.01)
(Continued)

(52) U.S. Cl.
CPC ............... *G01C 21/165* (2013.01); *G01S 19/13* (2013.01); *G06T 7/0046* (2013.01);
(Continued)

(58) Field of Classification Search
CPC ............. G01C 21/165; H04N 13/0203; H04N 13/0271; H04N 13/0007; H04N 2013/0081; G06T 7/0046; G06T 2207/30252; G06T 2207/10032; G06T 2207/30181; G01S 19/13; A61G 5/02; G11C 11/167
See application file for complete search history.

(56) References Cited

U.S. PATENT DOCUMENTS 7,938,756 B2    5/2011    Rodetsky et al.
8,177,705 B2    5/2012    Abolfathi
(Continued)

FOREIGN PATENT DOCUMENTS

CN    201260746 Y  *  6/2009
CN    101803988        8/2010
(Continued)

OTHER PUBLICATIONS

Rentschler et al.; "Intelligent Walkers for the Elderly: Performance and Safety Testing of VA-PAMAID Robotic Walker"; *Journal of Rehabilitation Research and Development*; vol. 40, No. 5; pp. 423-432; Sep./Oct. 2013.
(Continued)

*Primary Examiner* — Rodney Butler
(74) *Attorney, Agent, or Firm* — Snell & Wilmer LLP

(57) ABSTRACT

An intelligent navigation device is provided for actively collecting data about a user and the surrounding environment, drawing helpful inferences, and actively aiding the user in navigation, environmental awareness, and social interaction. The intelligent navigation device may include cameras for detecting image data regarding the surrounding environment. The intelligent navigation device may include a GPS unit, an IMU, and a memory for storing previously determined user data. The intelligent navigation device may include a processor for determining a desirable action or event based on the image data, data detected by the GPS unit or the IMU, or a recognized object in the surrounding environment. The processor may further determine a destination and provide navigation assistance to the user for reaching the destination. The intelligent navigation device may convey output data using a display, a speaker, a vibration unit, a mechanical feedback unit, or an electrical stimulation unit.

20 Claims, 17 Drawing Sheets

(51) Int. Cl.
  *G01S 19/13* (2010.01)
  *G06T 7/00* (2006.01)
  *H04N 13/02* (2006.01)

(52) U.S. Cl.
  CPC ...... *H04N 13/0007* (2013.01); *H04N 13/0203* (2013.01); *H04N 13/0271* (2013.01); *G06T 2207/10032* (2013.01); *G06T 2207/30181* (2013.01); *G06T 2207/30252* (2013.01); *H04N 2013/0081* (2013.01)

(56) References Cited

U.S. PATENT DOCUMENTS

| | | | |
|---|---|---|---|
| 8,583,282 B2 | 11/2013 | Angle et al. | |
| 2002/0067282 A1* | 6/2002 | Moskowitz et al. | 340/825.19 |
| 2004/0267442 A1* | 12/2004 | Fehr et al. | 701/200 |
| 2006/0292533 A1* | 12/2006 | Selod | 434/247 |
| 2011/0221670 A1 | 9/2011 | King et al. | |
| 2012/0085377 A1* | 4/2012 | Trout | 135/66 |
| 2012/0092161 A1 | 4/2012 | West | |
| 2012/0136666 A1* | 5/2012 | Corpier et al. | 704/275 |
| 2012/0232430 A1* | 9/2012 | Boissy et al. | 600/595 |
| 2012/0316884 A1* | 12/2012 | Rozaieski et al. | 704/275 |
| 2014/0345956 A1* | 11/2014 | Kojina | 180/6.5 |

FOREIGN PATENT DOCUMENTS

| | | | | |
|---|---|---|---|---|
| CN | 101647745 | | 1/2011 | |
| CN | 102323819 B | * | 6/2013 | |
| CN | 103445920 A | * | 12/2013 | |
| DE | 102011080056 | | 1/2013 | |
| DE | 102012000587 | | 7/2013 | |
| DE | 102012202614 | | 8/2013 | |
| EP | 1721237 | | 11/2006 | |
| JP | 2001304908 A | * | 10/2001 | G01C 21/00 |
| WO | WO 2004076974 A1 | * | 9/2004 | G01C 21/00 |
| WO | WO 2008/008791 | | 1/2008 | |
| WO | WO 2010/062481 | | 6/2010 | |
| WO | WO 2013/002452 | | 1/2013 | |

OTHER PUBLICATIONS

Universitat Politecnica de Catalunya; "Intelligent Walker Designed to Assist the Elderly and People Undergoing Medical Rehabilitation"; Science Daily; http://www.sciencedaily.com/releases/2008/11/081107072015.htm; Nov. 20, 2008.
Glover et al.; "A Robotically-Augmented Walker for Older Adults"; *Carnegie Mellon University*; 12 pages; Aug. 1, 2003.
www.orcam.com; 3 pages; Jul. 22, 2014.
Eccles, Lisa; "Smart Walker Detects Obstacles"; *Electronic Design*; 2 pages; Aug. 20, 2001.
Graft, Birgit; "An Adaptive Guidance System for Robotic Walking Aids"; Journal of Computing and Information Technology; *CIT 17*; pp. 109-120; 2009.
Frizera et al.; "The Smart Walkers as Geriatric Assistive Device"; *The SIMBIOSI Purpose*; 6 pages; Jan. 30, 2008.
Rodriquez-Losada et al.; "Guido, the Robtic Smart Walker for the Frail Visually Impaired"; International Conference on Domotics, Robotics and Remote Assistance for All; 14 pages; Apr. 18, 2008-Apr. 22, 2008.
Kayama et al.; "Outdoor Environment Recognition and Semi-Autonomous Mobile Vehicle for Supporting Mobility of the Elderly and Disabled People" *Journal of the National Institute of Information and Communications Technology*; vol. 54, No. 3; pp. 113-123; 2007.

* cited by examiner

INTELLIGENT MOBILITY AID DEVICE AND METHOD OF NAVIGATING AND PROVIDING ASSISTANCE TO A USER THEREOF

BACKGROUND

1. Field

The present invention relates to mobility aid devices and methods of assisting mobility aid device users.

2. Description of the Related Art

Mobility aid devices such as wheel chairs, mobility scooter, and walking aid devices (e.g., walkers) have been designed for users having certain physical mobility difficulties. The mobility aid devices enhance mobility and/or physical rehabilitation of the user. However, the mobility aid devices do not actively collect and analyze data regarding the user and the environment of the user to achieve an understanding of the user and the user's environment. Furthermore, the mobility aid devices known in the art do not actively aid the user in navigation, environmental awareness, and social interactions.

Thus, there is a need for a mobility aid device that actively collects data about the user and the his/her surrounding information, draws helpful inferences based on the collected data, and actively aids the user in navigation, environmental awareness, and social interactions.

SUMMARY

The present invention relates to an intelligent mobility aid device that actively collects data about the user and the his/her surrounding information, draws helpful inferences based on the collected data, and actively aids the user in navigation, environmental awareness, and social interaction. The intelligent mobility aid device may be an intelligent walking aid device.

In one embodiment, the intelligent mobility aid device has an inertial measurement unit (IMU) sensor for detecting inertial measurement data. The intelligent mobility aid device further has a global positioning system (GPS) for detecting location data. The intelligent mobility aid device further has a plurality of cameras for detecting image data regarding the surrounding environment and objects, persons, or other beings therein. Based on the detected data and previously stored data regarding the user and previously detected objects, the processor provides helpful information to the user. The helpful information may include navigation information. Furthermore, the processor may assist the user in navigating the intelligent mobility aid device via actuation. The actuation may include at least one of motorized control of the device, actuated steering, and/or actuated braking.

In one embodiment, an intelligent guidance device includes a plurality of wheels for travelling on a ground surface and a platform coupled to the plurality of wheels. The intelligent guidance device includes a left bar coupled to the platform and having a left grip, and a right bar coupled to the platform and having a right grip. The intelligent guidance device includes an IMU coupled to the platform and configured to detect inertial measurement data corresponding to a positioning, velocity, or acceleration of the intelligent navigation device. The intelligent guidance device further includes a GPS unit configured to detect location data corresponding to a location of the intelligent navigation device. The intelligent guidance device further includes a plurality of cameras coupled to the platform for detecting image data corresponding to a surrounding environment of the intelligent guidance device. The intelligent guidance device may also include a memory storing object data regarding previously determined objects and storing previously determined user data regarding the user.

The intelligent guidance device may also include a processor connected to the IMU, the GPS unit, and the plurality of cameras. The processor is configured to recognize an object in the surrounding environment by analyzing the image data based on the stored object data and at least one of the inertial measurement data or the location data. The processor is further configured to determine a desirable event or action based on at least one of the recognized object, the previously determined user data, or a current time or day. The processor is further configured to determine a destination based on the determined desirable event or action. The processor is further configured to determine a navigation path for navigating the intelligent guidance device to the destination based on the determined destination, the image data, and at least one of the inertial measurement data or the location data. The processor is further configured to determine output data based on the determined navigation path. The intelligent guidance device may also include a display for displaying an image to provide visual information to a user of the intelligent guidance device based on at least one of the recognized object, the determined desirable event or action, or the navigation path. The intelligent guidance device may also include a speaker for providing audio information to the user based on at least one of the recognized object, the determined desirable event or action, or the navigation path.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

Apparatus, systems and methods that implement the embodiments of the various features of the present application will now be described with reference to the drawings. The drawings and the associated descriptions are provided to illustrate some embodiments of the present application and not to limit the scope of the present application. Throughout the drawings, reference numbers are re-used to indicate correspondence between referenced elements.

The present invention relates to an intelligent mobility aid device (hereinafter also referred to as "the device") that actively collects data about the user and the his/her surrounding information, draws helpful inferences based on the collected data, and actively aids the user in navigation, environmental awareness, and social interaction. The device may be an intelligent walking aid device. The device has an inertial measurement unit (IMU) for detecting inertial measurement data. The device further has a global positioning system (GPS) unit for detecting location data. The device further has a camera unit including a plurality of cameras for detecting image data. Based on the detected data and data previously stored in a memory regarding the user and previously determined objects, a processor provides helpful information to the user. The helpful information may include navigation information. Furthermore, the processor may assist the user in navigating the device via actuation. The actuation may include at least one of motorized control of the device, actuated steering and/or actuated braking.

Figure 1A:
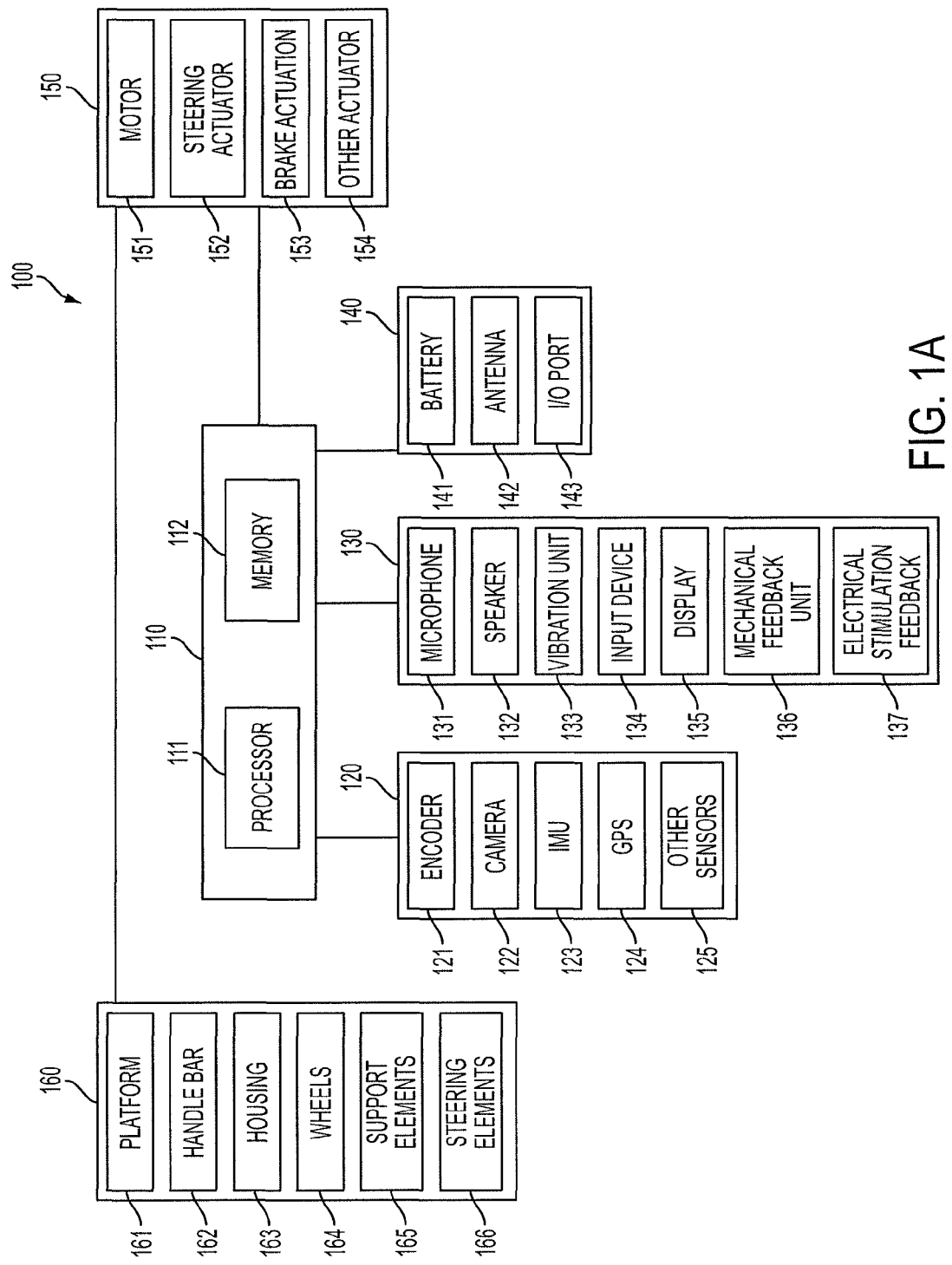
FIG. 1A is a block diagram of an intelligent mobility aid device according to an embodiment of the present invention.

FIG. 1A is a block diagram of an intelligent mobility aid device 100 (hereinafter also referred to as "the device 100") according to an embodiment of the present invention. In one embodiment, the device 100 includes an onboard processing array 110, which communicates with a sensor array 120, an interface array 130, a component array 140, and an electromechanical actuation array 150. The electromechanical actuation array 150 may include a motor unit 151, a steering actuator unit 152, a brake actuation unit 153, and other actuator(s) 154. The device 100 further includes a structural array 160. The structural array 160 may include a platform 161, a handle bar 162, a housing 163, a plurality of wheels 164, a plurality of support elements 165, and a steering element 166.

The arrays 110, 120, 130, 140, 150, and 160 are exemplary groupings to visually organize the components of the device 100 in the block diagram of FIG. 1A and are not limiting or necessarily representative of any physical groupings. In certain embodiments, more or less arrays are utilized depending on design concerns. In addition, certain embodiments may have more or less components shown in FIG. 1A. The embodiments shown in FIGS. 1B-1E are examples of how the components in FIG. 1A can be physically arranged. The components can be arranged differently based on design concerns. Not all features and components described herein are shown in FIGS. 1B-1E. Furthermore, the structure in FIGS. 1B-1E may be modified or another intelligent mobility aid device can be designed to include additional features described herein.

Figure 1B:
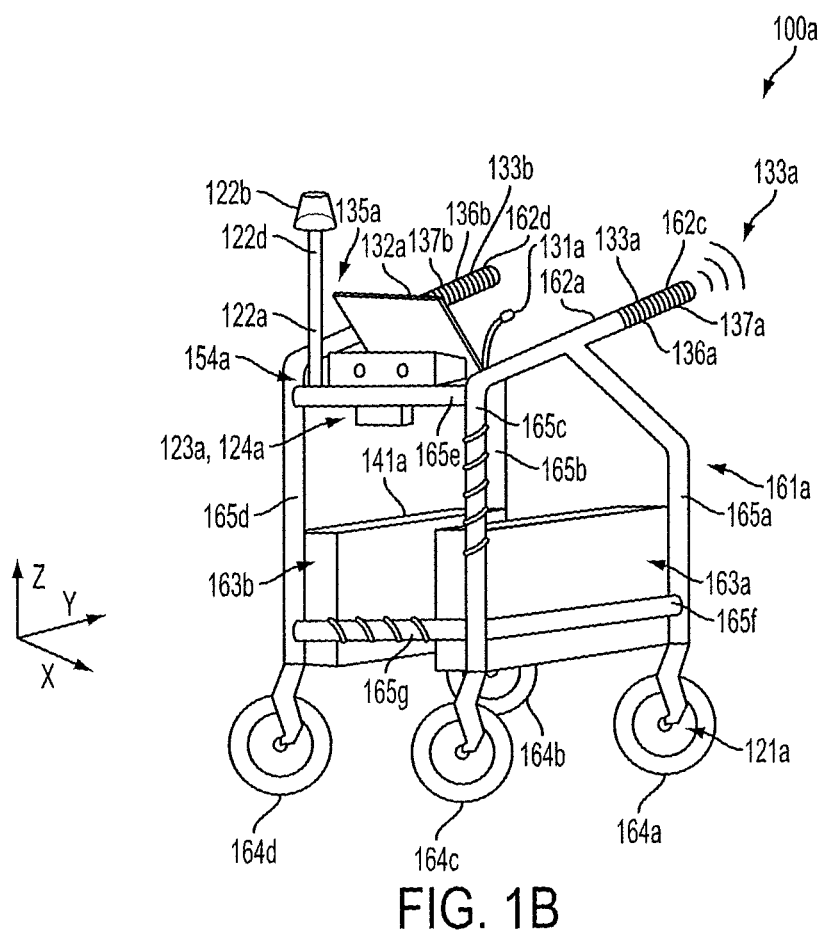
FIG. 1B illustrates an intelligent walking aid device according to an embodiment of the present invention.

Referring to FIG. 1B, the device 100 may be an intelligent walking aid device 100a (hereinafter "the walking aid device 100a or the device 100a"). The walking aid device 100a may be a walker having a platform 161a connected to a plurality of wheels 164a-d (a rear-left wheel 164a, a right-rear wheel 164b, a front-left wheel 164c, and a front-right wheel 164d). The platform 161a may further include a rear-left substantially vertical bar 165a, a rear-right substantially vertical bar 165b, a front-left substantially vertical bar 165c, and a front-right substantially vertical bar 165d connected to the front-left substantially vertical bar 165c via an upper substantially horizontal connecting bar 165e. The platform 161a may include or be connected to a left handle bar 162a with a left handle bar grip portion 162c and a right handle bar 162b with a right handle bar grip portion 162d.

Referring to FIGS. 1A and 1B, the vibration unit 133 may be a vibration motor or actuator capable of providing haptic and tactile output. In certain embodiments, the vibration unit 133 may also be capable of producing sounds, such that the speaker 132 and the vibration unit 133 may be the same or integrated. As shown in FIG. 1B, the vibration unit 133 may include a left vibration motor or actuator 133a and/or a right vibration motor or actuator 133b for providing haptic feedback to the user. One or more of the handle bars 162a, 162b and/or one or more of the handle bar grip portions 162c, 162d may vibrate for providing haptic feedback to the user. Vibration patterns on the left handle bar 162a/grip portion 162c can be different than vibration patterns on the right handle bar 162b/grip portion 162d. In this manner, different combination of left/right vibration patterns can convey more variety of useful information to the user (as opposed to outputting the same pattern in both left and right vibration). For example, certain vibration patterns on the left that are lacking on the right may be used to signal to the user that the user should turn left.

Referring to FIG. 1B, alternatively or in addition to haptic feedback, a mechanical feedback unit 136 may be utilized to provide feedback to the user. For example, instead of or in addition to vibration on the left handle bar 162a/grip portion 162c, the left handle bar 162a/grip portion 162c may be mechanically rotated or moved to provide feedback to the user. A first mechanical feedback unit 136a having a rotatable or movable element proximal to the left handle bar 162a/grip portion 162c, and a second mechanical feedback unit 136b having a rotatable or movable element proximal to the right handle bar 162b/grip portion 162d may be provided. The processor 111 may control the first mechanical feedback unit 136a to provide a first feedback based on the determined output data, and control the second mechanical feedback unit 136b to provide a second feedback based on the determined output data, the second feedback being different than the first feedback. The difference in the two mechanical feedbacks can be used to convey information to the user similarly to the process discussed above with respect to haptic/vibration feedback.

The mechanical rotation/movement can be used if it is predetermined or if the processor 111 recognizes (based on collected data and/or user input) that the user cannot sufficiently sense the vibrations which are typically more subtle than pronounced mechanical feedback. Similarly, electrical simulation feedback unit 137 may be utilized to provide feedback to the user. For example, the surface of the left handle bar grip portion 162c may be covered with left actuatable electrical simulator 137a and/or the right handle bar grip portion 162d may be covered with right actuatable electrical simulator 137b to provide feedback to the user. The processor 111 may provide multi-mode output using a combination of vibration, electrical simulation, mechanical feedback, speech, display, etc.

Referring to FIGS. 1A and 1B, the device 100 may optionally include a housing 163 encompassing an onboard processing array 110 and/or a battery 141. The components of arrays 110-160 can be arranged with or without the housing. Physical arrangement of arrays 110-160 is in part based on the weight distribution. Referring to FIG. 1B, for example, in one embodiment, most of the weight of arrays 110-160 is directed towards the user rather than towards the front of the walking aid device 100a. If the weight is concentrated towards the front portion of the walking aid device 100a and away from the user, the user may have difficulty with turning the walking aid device 100a in certain embodiments. For example, the battery 141a may have significant weight and positioned proximal to the rear side.

Referring to FIGS. 1A and 1B, the onboard processing array 110 includes a processor 111 and a memory 112. The processor 111 may be a computer processor such as an ARM processor, DSP processor, distributed processor, or other form of central processing. The memory 112 may be a RAM or other volatile or nonvolatile memory used by the processor 111. The memory 112 may be a non-transitory memory or a data storage device, such as a hard disk drive, a solid state disk drive, a hybrid disk drive, or other appropriate data storage, and may further store machine-readable instructions, which may be loaded and executed by the processor 111. Although the memory 112 is shown as part of the onboard processing array 110, alternatively or in addition, the memory 112 may include a cloud-based storage or another memory in communication with the processor 111. As shown in FIG. 1B, the left housing 163a and/or the right housing 163b may include a computer having the processor 111 and the memory 112. The size and processing capabilities of the computer may differ based on expected application of the walking aid device 100a. For example, a full standard computer may not be required for vision processing. Rather, a laptop-size computer may be utilized. Alternatively, the processor 111 and the memory 112 may be a processor and a memory of a tablet computer positioned adjacent to the upper substantially horizontal connecting bar 165e. The tablet computer may include a display similarly positioned as the display 135a.

Referring to FIGS. 1A and 1B, the sensor array 120 includes an encoder 121, a camera unit 122, an IMU 123 (e.g., IMU 123a shown in FIG. 1B), a GPS unit 124 (e.g., GPS unit 124a shown in FIG. 1B), and additional sensor(s) 125.

The encoder 121 is connected to and detected data from the plurality of wheels 164. Using data detected by the encoder 121, the processor 111 can determine the distance traveled by the user and/or speed traveled by the user by keeping track of rotation of the plurality of wheels 164. The processor 111 can further determine calories consumed by the user, average speed traveled by the walking aid device 100a, and other data regarding movement and navigation of the walking aid device 100a.

The IMU 123 may include one or more of an accelerometer, a gyroscope, and/or a magnetometer for determining a positioning, velocity, or acceleration of the device 100. The GPS unit 124 may be one or more GPS units. The IMU 123, GPS unit 124, and/or the encoder 121 may be utilized to determine the location and/or positioning of the user and/or the device 100.

Referring to FIGS. 1A and 1B, in one embodiment, the camera unit 122 may include a stereo camera having at least two cameras offset by a stereo distance. For example, FIG. 1B shows a stereo camera 122a connected to the upper substantially horizontal connecting bar 165e. The stereo camera 122a includes two cameras separated by a stereo distance. The stereo distance may be optimized for the two cameras of the stereo camera 122a. The intelligent mobility aid device 100 may have more than one stereo camera. The one or more stereo cameras provide depth information in both indoor and outdoor environments. The stereo camera 122a may face forward, in front of a user, to establish a field of view (FOV). The stereo camera 122a may have, for example, a FOV of around 90 degrees. The stereo camera 122a provides 3D information such as depth in front of the user.

Referring to FIGS. 1A and 1B, the camera unit 122 may include additional cameras 122c (not shown) placed to the sides of the stereo camera 122a to increase the FOV to, for example, around 120 degrees. Although additional cameras 122c may be monocular, they can provide simple recognition, even without depth or distance information. For example, the additional cameras 122c can detect moving objects in the user's periphery. The stereo camera 122a and the additional cameras 122c continuously recognize objects in the environment. "Object" as used herein may refer to objects found in the surrounding environment of the device 100. An object may refer to a part of a person or a living being. An object is recognized by the processor 111 as discussed in further details below with respect to FIGS. 2-6B.

The camera unit 122 may further include other optical sensors. In addition or alternatively, the camera unit 122 may include an omnidirectional camera 122b (not shown) to increase the field of view and capture the environment around the user at one shot.

The platform 161 enables cameras to be positioned at different locations. Adding multiple cameras is beneficial for increasing the field of view, and also for capturing a view that may be obstructed by the device 100 itself if a single camera is utilized. For example, a single omnidirectional camera's view may be blocked by a physical component of the walking aid device 100a. To obtain the full 360 view, multiple cameras may be positioned at different vantage points on the platform 161a. For example, additional cameras may be positioned on or on an extension above one or more of the bars 165a-e. Additional cameras may be positioned on or above the handle bars 162a and/or 162b. The multiple captured images can be fit together via image processing to capture a broader spectrum of the surrounding environment.

Referring to FIGS. 1A and 1B, in one embodiment, the other actuator 154 may include a camera-positioning actuator 154a connected to an adjustable-height substantially vertical bar 122d to improve the vantage point of the omnidirectional camera 122b. For example, the camera-positioning actuator 154a may vertically displace the cameras up and down to improve the corresponding field of view and avoid blocking of view by obstacles or components of the walking aid device 100a. Similar actuation may be adopted for additional cameras 122c (not shown) of the camera unit 122. In one embodiment, the front-left substantially vertical bar 165c and/or the front-right substantially vertical bar 165d may extend to a height above the user, and an omnidirectional camera 122b may be positioned on top of the extended bar to capture a full 360 view of the surrounding environment. A different number of cameras, cameras with other orientations, and/or cameras at different locations or heights may be utilized based on design concerns.

The device 100 assists the user for environmental awareness, navigation, social interactions, and obstacle avoidance through real-time feedback. The device 100 is capable of recognizing objects around the user, in order to alert the user. For example, the device 100 may be used by a blind person to aid in environmental awareness and navigate safely around obstacles. The device 100 provides the user audio and/or haptic feedback through the speaker 132 and/or the vibration unit 133 based upon camera input from the cameras 122. In such applications for a blind or partially blind user, a low-light viewing or night-vision camera (e.g., infrared camera) may also be utilized. For example, a camera may be directed to normal lighting and another directed to night vision. For example, a blind user may be more likely to turn off the lights because he/she does not depend on the lighting. The walking aid device 100a would still function properly by processing images of the night-vision camera. The image processed may be limited in night-vision. For example, facial recognition may not be feasible, but the presence of another person can be detected. As a result, helpful information can be given to the user.

Referring to FIGS. 1A and 1B, additional sensor 125 may be one or more sensors which provide further information about the environment in conjunction with the rest of the sensor array 120. An additional sensor 125 may be, for example, one or more of a temperature sensor, an air pressure sensor, a moisture or humidity sensor, a gas detector or other chemical sensor, a sound sensor, a pH sensor, a smoke detector, a metal detector, an actinometer, an altimeter, a depth gauge, a compass, a radiation sensor, a motion detector, or an additional sensor.

Referring to FIG. 1A, the interface array 130 further includes a microphone 131, a speaker 132, and a display 135 in addition to the vibration feedback unit 133, the mechanical feedback unit 136 and electrical simulation feedback unit 137.

The microphone 131 may be a microphone or other device capable of receiving sounds, such as voice activation/commands or other voice actions from the user, and may be integrated with or external to the intelligent mobility aid device 100. For example, referring to FIG. 1B, the microphone 131a may be positioned proximal to the upper substantially horizontal connecting bar 165e.

Referring to FIGS. 1A and 1B, the microphone 131 may serve as an input device for receiving information/commands from the user. The microphone 131 may further provide additional environmental data, such as sounds of moving cars or other possible hazards. The microphone 131 may work in conjunction with the speaker 132, and may be placed away from the speaker 132 to prevent interference. The microphone 131 may alternatively work in conjunction with an attached audio device, such as bone conduction devices, to provide the user with audio feedback without broadcasting the audio feedback.

Referring to FIGS. 1A and 1B, the speaker 132 may be one or more speakers (e.g., speaker 132a in FIG. 1B) or other devices capable of producing sounds and/or vibrations.

The input device 134 may be an input device such as a touch sensor and/or one or more buttons. For example, the input device 134 may be a touch sensor used as a slider to adjust settings as well as act as a button for making selections, similar to a touchpad.

Referring to FIGS. 1A and 1B, the display 135 may be a display, integrated into the intelligent mobility aid device 100 or wirelessly connected to the intelligent mobility aid device 100, and may be capable of displaying visual data from the stereo camera 122a and/or other cameras of the camera unit 122. In other embodiments, the display 135 may be another visual alert device, such as one or more LEDs or similar light source.

The display 135 can appropriately remind the user with memory retention difficulties. For example, the display 135 may display an image indicating information about activities of the user to remind the user. For example, the displayed information may be based on the task that the user is currently performing, and the destination that the user is travelling towards. The displayed information may further correspond to the surrounding environment. For example, the information may correspond to identity, location and movement of others currently around the user. For example, a user with memory retention difficulties may not recognize the people around the user. The processor may determine identity of the nearby person using facial recognition based on data detected by the camera unit 122. The display 135 may further indicate current events based on current time/date and previously collected data.

Referring to FIGS. 1A and 1B, the component array 140 includes a battery 141, an antenna 142, and an input/output (I/O) port 143. For example, the I/O port 143 may be a headphone jack, or may be a data port.

The battery 141 may be a battery or other power supply capable of powering the device 100. For example, FIG. 1B shows a left housing 163a and a right housing 163b. The battery 140a may be positioned in the left housing 163a, the right housing 163b, or both housings 163a and 163b. The battery 141 may have a connection port for recharging, or may be wirelessly recharged, such as through induction charging.

Referring to FIGS. 1A and 1B, the battery 141 can be connected to an external power source or outlet via a power cord. Alternatively or in addition, the battery 141 can be charged via wireless charging. Battery size and capacity may differ based on design concerns such as the required computation. Additional battery size and capacity may be required if navigation of the device 100 is electromechanically actuated using the electromechanical actuation array 150. Additional capacity may be required based on the average operation time. In certain embodiments that movement is actuated using the electromechanical actuation array 150, a motor 151 may be provided for actuation, and the motor 151 may operate as a generator or be connected to a generate to regenerate energy as the walking aid device 100a is moved. That is, electrical energy may be regenerated from travelling and stored in the battery 141. The processor 111 may further determine the amount of regenerated energy. The processor 111 may output data to the user regarding their fitness, health, and energy consumption based in part on the amount of regenerated energy.

Referring to FIGS. 1A and 1B, the antenna 142 may be one or more antennas capable of transmitting and receiving wireless communications. For example, the antenna 142 may be a Bluetooth or WiFi antenna, may be a radio frequency identification (RFID) antenna or reader, mobile telecommunication antenna (e.g., third generation (3G)) and/or a near field communication (NFC) unit. The I/O port 143 may be one or more ports for connecting additional peripherals. The antenna 142 may be wirelessly or wire connected to the processor 111.

The processor 111 may wirelessly connect to another processor of a smart phone, tablet, computer, laptop, or other computer-based devices via the antenna 142. The connection can be established using various wireless communication means, for example, Bluetooth or Wi-Fi. The connection can assist the user in sharing data among various devices in addition to utilizing functionality of the connected devices. The antenna 142 and/or the I/O port 143 allow the device 100 to connect to another device or network for data downloads, such as updates, map information or other relevant information for a particular application, and data uploads, such as status updates.

Further, the antenna 142 and/or the I/O port 143 allow the device 100 to communicate with other portable electronic devices (such as a smartphone, tablet, laptop, or other electronic device having storage and/or processing capabilities) or other mobility aid devices for distributed computing or sharing resources. The intelligent mobility aid device 100 described herein is generally a stand-alone device. The portable electronic device may also serve as an additional or alternative display unit for the intelligent mobility aid device 100.

The mobility aid device may further include optional elements such as a cup/bottle holder, cane/umbrella holder, and a flash light for travelling in the dark.

Figure 1C:
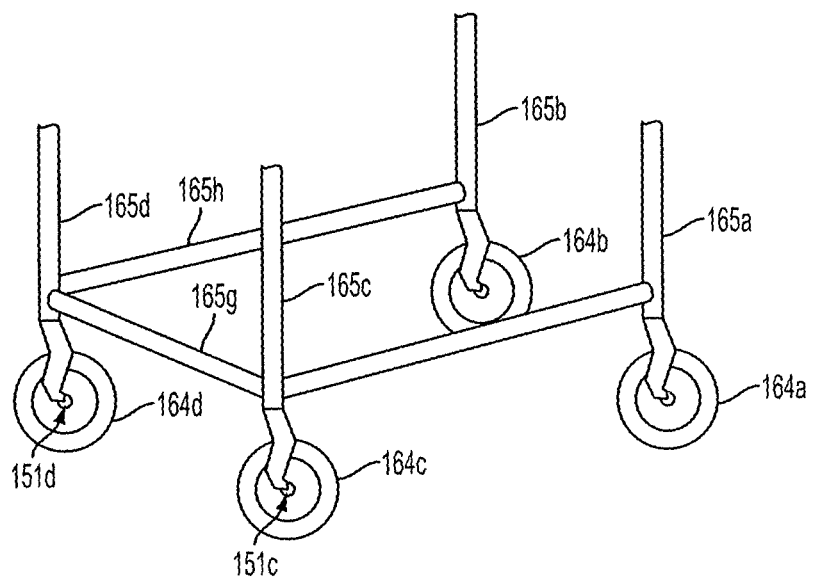
FIG. 1C illustrates an intelligent walking aid device having motor actuators for maneuvering the intelligent walking aid device according to an embodiment of the present invention.
Figure 1D:
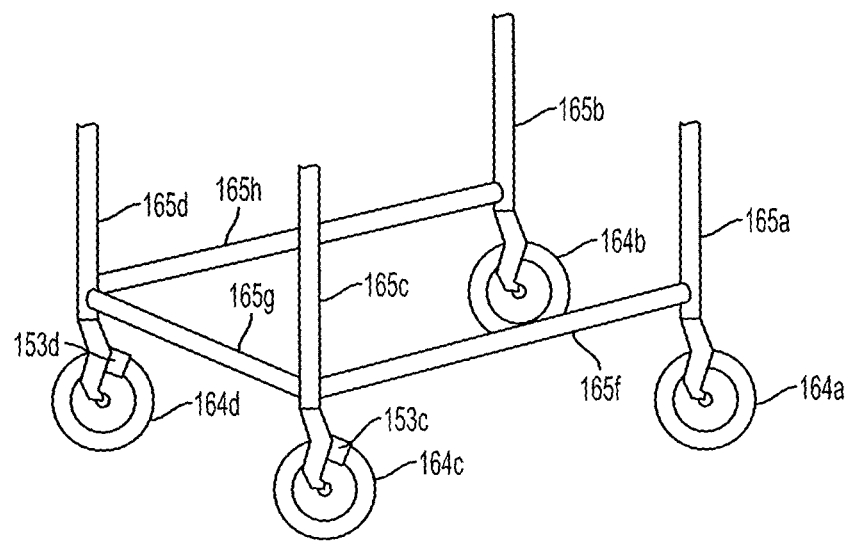
FIG. 1D illustrates an intelligent walking aid device having braking actuators for maneuvering the intelligent walking aid device according to an embodiment of the present invention.
Figure 1E:
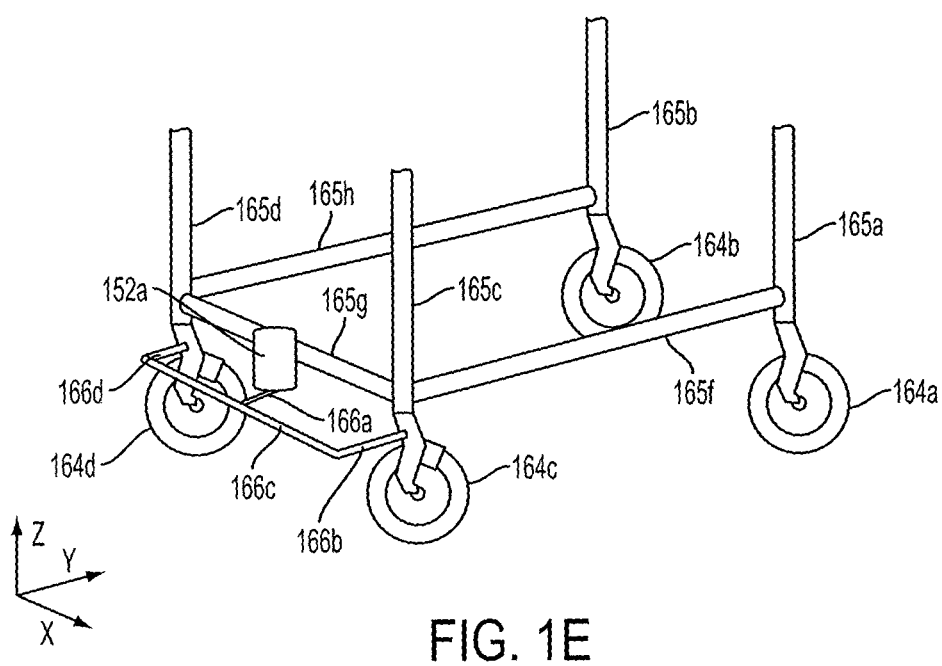
FIG. 1E illustrates an intelligent walking aid device having steering actuators for maneuvering the intelligent walking aid device according to an embodiment of the present invention.

Referring to FIGS. 1C-1E, certain embodiments of the walking aid device 100a are shown. For illustration purposes, only certain elements relevant to the actuation discussion are shown. A person of ordinary skill in the art would appreciate that the shown elements can be incorporated with the embodiments discussed above with respect to FIGS. 1A and 1B.

The electromechanical actuation array 150 may include a motor unit 151. Referring to FIG. 1C, in one embodiment, the motor unit 151 may include a front-left motor 151c (for example, a wheel hub drive motor) for driving the front-left wheel 164c and a front-right motor 151d (for example, a wheel hub drive motor) for driving the front-right wheel 164d. In one embodiment, the motor unit 151 may include a motor-generator or an additional generator for storing regenerated energy in the battery 141. The motors 151a and 151b may be powered using the battery 141. In one embodiment, only front wheels 164c, 164d are motor driven. In another embodiment, rear wheels 164a, 164b may be alternatively or in addition motor driven.

Referring to FIG. 1D, the electromechanical actuation array 150 may include a front-left actuatable brake 153c for decelerating the front-left wheel 164c and a front-right actuatable brake 153d for decelerating the front-right wheel 164d. In one embodiment, braking is applied only to front wheels 164c, 164d. The deceleration can be controlled to steer the walking aid device 100a. Alternatively or in addition, braking may be applied to rear wheels 164a, 164b.

Referring to FIG. 1E, a lower-left substantially horizontal bar 165f connects the rear-left substantially vertical bar 165a to the front-left substantially vertical bar 165c, and a lower-right substantially horizontal bar 165h connects the rear-right substantially vertical bar 165b to the front-right substantially vertical bar 165d. A front-left substantially horizontal steering bar 166b is connected to the front-left substantially vertical bar 165c in a portion proximal to the front-left wheel 164c. A front-right substantially horizontal steering bar 166d is connected to the front-right substantially vertical bar 165d in a portion proximal to the front-left wheel 164d. A front substantially horizontal steering bar 166c connects the front-left substantially horizontal steering bar 166b and the front-right substantially horizontal steering bar 166d. A substantially horizontal steering bar 166a is connected to a steering actuator 152a. The steering actuator 152a may be powered by the battery 141 and cause horizontal rotation of steering bars 166a-d on the x-y plane to steer the front wheels 164c and 164d to the left or to the right. In actuated embodiments (such as embodiments discussed with respect to FIGS. 1C-1E), additional battery capacity may be required for actuating movement of the device 100a.

The components of the device 100 can be utilized to improve social interactions. For example, the device 100 may recognize faces in a room to identify potential friends, and provide the user with audio feedback identifying friends. The stereo camera 122a and/or other cameras of the camera unit 122 may be further able to determine additional details about persons, such as moods or expressions, or if they are engaging in physical activities, in order to alert the user. For example, the potential friend may extend a hand for a handshake or a "high five," and the intelligent mobility aid device 100 may use audio or haptic feedback to notify the user. The microphone 131 may recognize voices of other persons to identify and appropriately notify the user, or may recognize a new voice to save for future identification.

Figure 2:
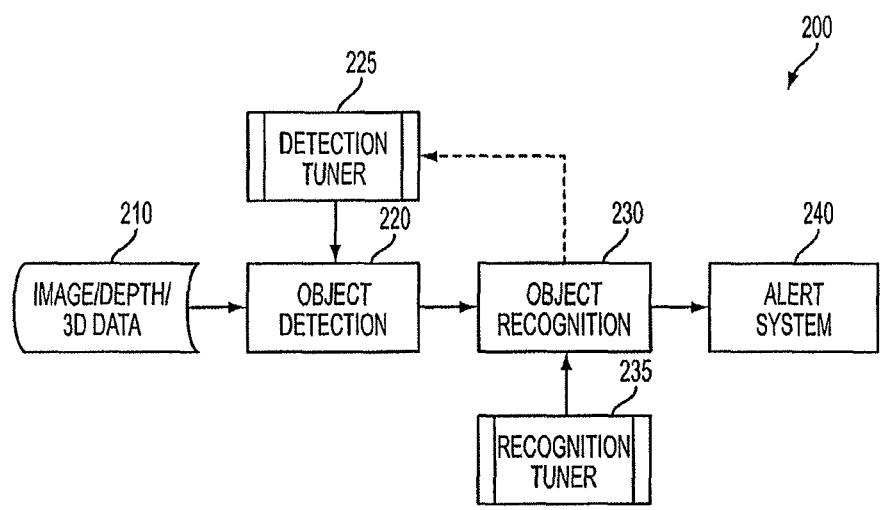
FIG. 2 is a flowchart of an object recognition logic according to an embodiment of the present invention.

Referring now to FIG. 2, a flowchart of a method 200 of adjusting object detection parameters, object recognition parameters, or both object detection parameters and object recognition parameters is schematically depicted. In some embodiments, the method 200 may be implemented as logic within the machine readable instructions that, when executed by the processor 111, automatically adjust object detection parameters, object recognition parameters, or both object detection parameters and object recognition parameters. It is noted that, while the method 200 depicts a specific sequence, additional embodiments of the present invention are not limited to any particular sequence.

Referring to FIG. 2, at block 210 the intelligent mobility aid device 100 receives image data representative of the environment. As noted above, in some embodiments, the intelligent mobility aid device 100 is configured to acquire video or image data, which may be video frames, of the FOV of the user from the cameras 122 (including for example, the stereo camera 122a), and to then send the acquired image data of the environment to the processor 111 and/or the memory 112 for storage and/or processing. In some embodiments, the intelligent mobility aid device 100 may receive image data from a source external to the intelligent mobility aid device 100, such as via the antenna 142 through a wireless network.

The image data received at block 210 may be data of a variety of forms, such as, but not limited to red-green-blue ("RGB") data, depth image data, three dimensional ("3D") point data, and the like. In some embodiments, the intelligent mobility aid device 100 may receive depth image data from an infrared sensor or other depth sensor, such as an infrared sensor or depth sensor integrated with the camera unit 122. In other embodiments that include a depth sensor (e.g., an infrared sensor), the depth sensor may be separate from the stereo camera 122a and the camera unit 122.

Still referring to FIG. 2, at block 220, the machine readable instructions stored in the memory 112, when executed by the processor 111, cause the intelligent mobility aid device 100 to detect a candidate object, with the onboard processing array 110, based on the image data received at block 210. In some embodiments, the onboard processing array 110 may detect the candidate object by identifying a candidate region of the received image data, such as a region of the image that includes high entropy. For example, the onboard processing array 110 may detect a high entropy region in the acquired target image data that includes a spray bottle. In some embodiments, the onboard processing array 110 may utilize a sliding window algorithm to identify the candidate region of the received image data. In embodiments, the onboard processing array 110 may detect the candidate object by utilizing a feature descriptor algorithm or an image descriptor algorithm, such as scale-invariant feature transform ("SIFT"), speeded up robust feature ("SURF"), histogram of oriented gradients ("HOG"), generalized search tree ("GIST"), fast retina keypoint ("FREAK"), and binary robust invariant scalable keypoints ("BRISK"), and the like. In some embodiments, the onboard processing array 110 may bias detections to one or more spatially located regions of interest based on application, scene geometry and/or prior information.

The onboard processing array 110 includes at least one object detection parameter to facilitate the detection of the candidate object. In some embodiments, the at least one object detection parameter is a window size, a noise filtering parameter, an estimated amount of light, an estimated noise level, a feature descriptor parameter, an image descriptor parameter, or the like.

Still referring to FIG. 2, at block 230, the machine readable instructions stored in the memory 112, when executed by the processor 111, cause the intelligent mobility aid device 100 to recognize an object, with the onboard processing array 110, based on the image data received at block 210. In some embodiments, the object recognition module may recognize the object based on a candidate region identified by the onboard processing array 110.

In some embodiments, the onboard processing array 110 may recognize the candidate object by utilizing a feature descriptor algorithm or an image descriptor algorithm, such as scale invariant feature transform ("SIFT"), speeded up robust feature ("SURF"), histogram of oriented gradients ("HOG"), generalized search tree ("GIST"), fast retina keypoint ("FREAK"), and binary robust invariant scalable keypoints ("BRISK"), and the like. In some embodiments in which the onboard processing array 110 utilizes a feature descriptor or image descriptor algorithm, the onboard processing array 110 may extract a set of features from a candidate region identified by the onboard processing array 110. The onboard processing array 110 may then access a reference set of features of an object recognition reference model from an object recognition database stored in the memory 112 and then compare the extracted set of features with the reference set of features of the object recognition reference model.

For example, the onboard processing array 110 may extract a set of features from the high entropy region of the acquired target image data that includes a bottle and compare the extracted set of features to reference sets of features for one or more reference bottle models. When the extracted set of features match the reference set of features, the onboard processing array 110 may recognize an object (e.g., recognizing a bottle when the extracted set of features from the high entropy region of the acquired target image data that includes the bottle match the reference set of features for a reference bottle model). When the extracted set of features does not match the reference set of features, an object recognition error has occurred (e.g., an object recognition error indicating that no object recognition reference model matches the candidate object). When an object recognition error has occurred (e.g., referring to the example, no reference bottle model exists in the memory 112), the at least one object detection parameter may be adjusted to improve the accuracy of the object detection module, as described below with reference to block 225.

In some embodiments, the object recognition module may assign an identifier to the recognized object. For example, the identifier may be an object category identifier (e.g., "bottle" when the extracted set of features match the reference set of features for the "bottle category" or "cup" when the extracted set of features match the reference set of features for the "cup" object category) or a specific object instance identifier (e.g., "my bottle" when the extracted set of features match the reference set of features for the specific "my bottle" object instance or "my cup" when the extracted set of features match the reference set of features for the specific "my cup" object instance).

The onboard processing array 110 includes at least one object recognition parameter to facilitate the recognition of the object. In some embodiment, the at least one object recognition parameter is a window size, a noise filtering parameter, an estimated amount of light, an estimated noise level, a feature descriptor parameter, an image descriptor parameter, or the like.

Still referring to FIG. 2, at block 240, the machine readable instructions stored in the memory 112, when executed by the processor 111, cause the intelligent mobility aid device 100 to send control signals to the vibration unit 133 and/or the speaker 132 to provide appropriate haptic and audio feedback to the user. For example, if the object recognized is categorized as an obstacle, the vibration unit 133 may vibrate at an increasing rate as the intelligent mobility aid device approaches it. If the object is categorized as a hazard, the speaker 132 may play a warning sound. If the object is categorized as a point of interest, the speaker 132 may play an appropriate notice, or may remain silent. As noted above, when an object recognition error has occurred, the at least one object detection parameter may be adjusted to improve the accuracy of the onboard processing array 110.

Still referring to FIG. 2, at block 225, the machine readable instructions stored in the memory 112, when executed by the processor 111, cause the intelligent mobility aid device 100 to adjust at least one object detection parameter of the onboard processing array 110, with a detection tuner module, when an object recognition error has occurred. The detection tuner module may be implemented as instructions executed by the processor 111 and data stored on the memory 112. By way of non-limiting example, in some embodiments, the detection tuner module may adjust the window size utilized by the onboard processing array 110 when an object recognition error has occurred. In some embodiments, the detection tuner module includes a detection tuner model and the detection tuner model adjusts the at least one object detection parameter based on the object recognition error. In some embodiments, the detection tuner model maps the object recognition error to the adjusted at least one object detection parameter. In some embodiments, the detection tuner model is a learned correlation model, such as a support vector machine ("SVM") model.

Still referring to FIG. 2, at block 235, the machine readable instructions stored in the memory 112, when executed by the processor 111, cause the intelligent mobility aid device 100 to adjust at least one object recognition parameter of the onboard processing array 110, with a recognition tuner module, when object recognition error has occurred. The recognition tuner module may be implemented as instructions executed by the processor 111 and data stored on the memory 112. By way of non-limiting example, in some embodiments, the recognition tuner module may adjust the window size utilized by the onboard processing array 110 when object recognition error has occurred. In some embodiments, the recognition tuner module includes a recognition tuner model and the recognition tuner model adjusts the at least one object recognition parameter based on the object recognition error. In some embodiments, the recognition tuner model maps the object recognition error to the adjusted at least one object recognition parameter. The recognition tuner model may be a learned correlation model, such as a support vector machine ("SVM") model.

Figure 3B:
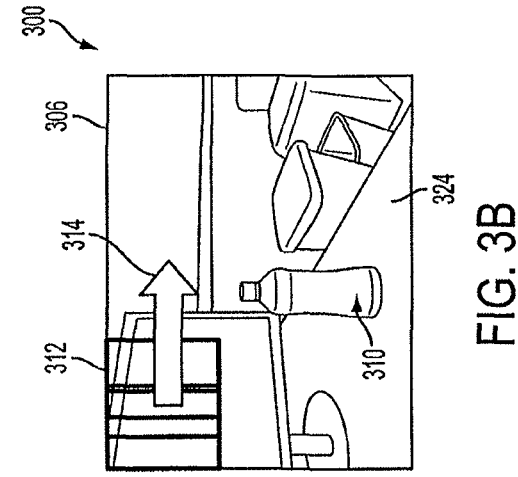
FIG. 3B further illustrates the object recognition logic shown in FIG. 3A.
Figure 3C:
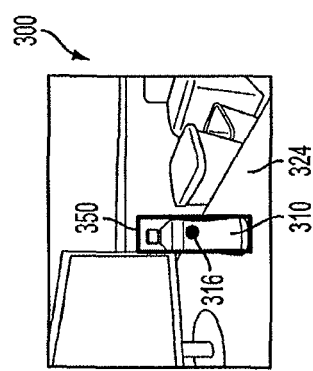
FIG. 3C further illustrates the object recognition logic shown in FIG. 3A.
Figure 3A:
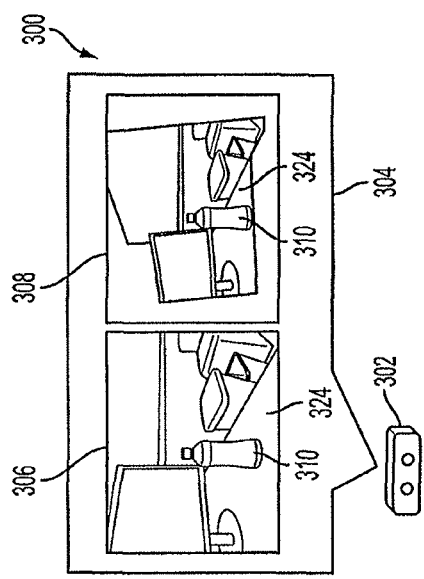
FIG. 3A illustrates an object recognition logic applied to a visual data set according to an embodiment of the present invention.

Referring now to FIGS. 3A-3C, FIGS. 3A-3C present one example of a method of object recognition according to an embodiment of the present invention. In FIG. 3A, for example, the first visual data 306 corresponds to a 2-D image of the target object 310 positioned on a plane 324 (e.g., a table). The second visual data 308 corresponds to 3-D depth data of the target object 310 positioned on the plane 324. Category object recognition is performed for analyzing, using the processor 111 and the first visual data 306. The first visual data 306 is analyzed based on a plurality of object models stored in a database, which may be stored in the memory 112. For example, the plurality of object models may include primitive shapes such as cylinders, boxes, and the like associated with corresponding parameters defining the primitive shapes. For example, the processor 111 may determine whether any portion of the first visual data 306 corresponds in shape, structure, or in terms of other pose information, to the plurality of object models stored in the database. Each of the plurality of object models may have at least one parameter. For example, an object model may be a cylinder with parameters of a height and a radius. For example, an object model may be a box with three parameters of a width, a height and a length.

When the processor 111 searches for an object model of the plurality of object models, more than one object model may be similar in shape or structure to a portion of the first visual data 306. For example, a body of a bottle (e.g., the target object 310) may be similar in shape or structure to either a cylinder or a box. The processor 111 is configured to determine which of the plurality of object models has the closest fit for the analyzed portion of the first visual data 306. For example, the processor 111 may assign a score (for example, a recognition accuracy percentage) as to the degree of similarity between a particular object model of the plurality of object models and the analyzed portion of the first visual data 306. For example, the processor 111 may choose the object model of the plurality of object models associated with the highest associated score (e.g., recognition accuracy percentage), as the object model that corresponds to the analyzed portion of the first visual data 306. As such, in one embodiment, the processor 111 determines the parameters of the chosen object model.

As described below, the plurality of object models are not fixed. The stored object models and their corresponding parameters may be supplemented or modified. In addition or in the alternative, new category object models may be learned and stored in the database based on the recognized target objects. The discussion at this juncture assumes that the method is detecting the target object 310 for the first time, and objects having similar shapes, structure, or pose information to the target object 310 as a whole are not yet encountered and stored.

Referring to FIG. 3B, an example of the category object recognition of the method is illustrated. For example, the processor 111 may examine the first visual data 306 adjacent to, around, or within the sliding enclosure 312 from left to right, starting from the top left corner of the 2-D image represented by the first visual data 306 moving right thereafter in the direction 314. The processor 111 may recognize objects within the first visual data 306 that are similar in shape or structure to an object model of the plurality of object models stored in the database. In other embodiments, instead of the sliding enclosure 312, the visual data set 304, the first visual data 306, the second visual data 308, or combinations thereof may be examined as a whole to determine whether any portion of the first visual data 306 matches an object model stored in the database.

FIG. 3C illustrates a result of the category object recognition. The processor 111 may recognize that the target object 310 is similar to one of the object models. The first enclosure 350 may be a bounding box, a bounding circle, or any other shape without limiting the scope of the invention. The first enclosure 350 has a first center point 316. When the first enclosure 350 is a bounding box, the first center point 316 is the point with approximately equal distance from each side of the bounding box. When the first enclosure 350 is a bounding circle, the first center point 316 may be the center of the bounding circle. In one embodiment, the processor 111 may determine the first center point 316 such that the first center point 316 is positioned on, corresponds to, or falls within a portion of the visual data set 304 corresponding to the target object 310. The target object 310 may, for example, be positioned within, around, or adjacent to the first enclosure 350. The processor 111 determines that a first target data (which is a portion of the first visual data 306) corresponds to the target object 310 to recognize the target object 310.

Although the method described above uses a bottle as an exemplary object, the method may be used to recognize points of interest and other features, such as stairs, empty seats or buildings. For example, the object recognition may be utilized to determine an empty seat without presence of a person. A seat can be recognized as a collection of category objects that make up an empty chair. For example, a seat can be recognized as a substantially horizontally positioned surface positioned on 4 legs recognized by straight vertical lines with a back rest positioned on the surface (which is detected as a collection of primitive shapes that make up a person). The components of the seat and the relative positioning of the components can be compared to stored objects in the database to recognize the seat. For example, a person could be represented by a circular shape at the top of his head, a straight line that represents the torso and two other segments which represent the legs. The camera unit 122 (e.g., stereo camera 122a and/or omnidirectional camera 122b) may be utilized to determine edge features, contours and depth information. An empty seat can be recognized as having a recognized chair without recognizing a person positioned on top of the horizontal surface of the chair. The device 100 can navigate the user to the empty seat. For example, the intelligent mobility aid device 100 may direct the user to an empty seat, or may remember the user's specific seat in order to navigate away and subsequently return to the same seat.

Figure 4:
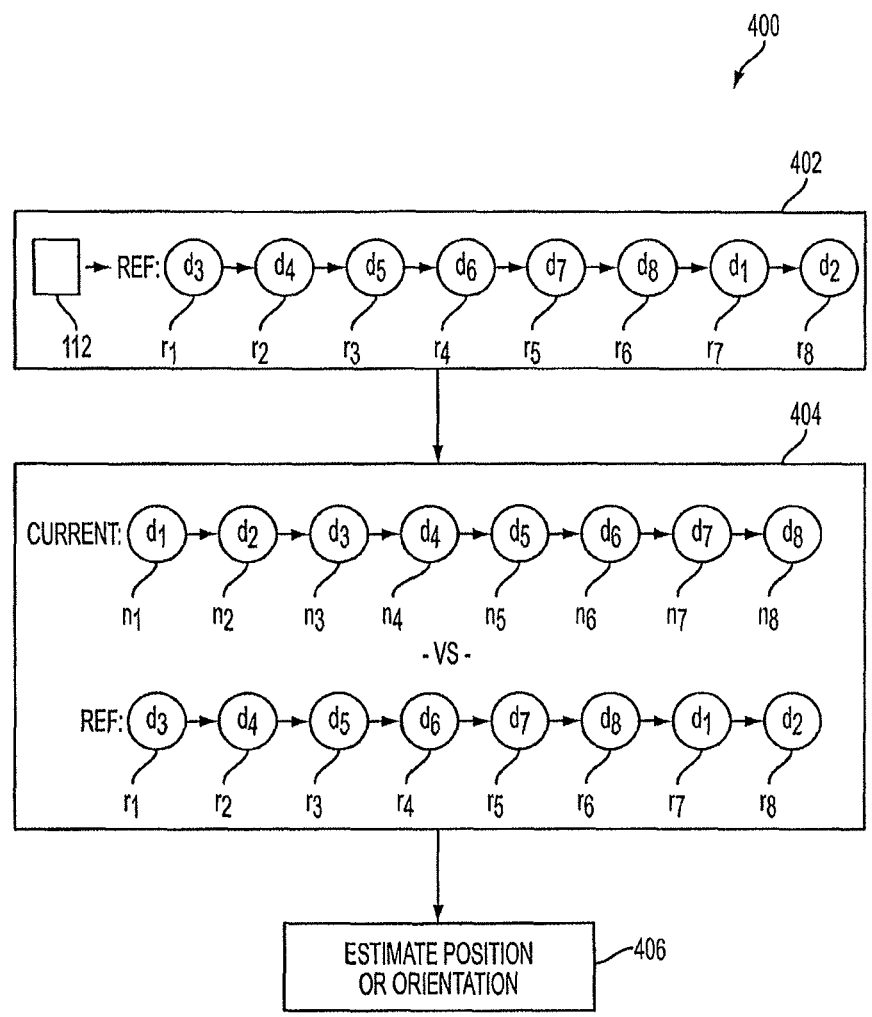
FIG. 4 is a flowchart illustrating a method of estimating a position or orientation based on slice descriptors according to an embodiment of the present invention.

FIG. 4 shows a flowchart 400 of a method of estimating position or orientation based on slice descriptors. The onboard processing array 110 receives omnidirectional image data representative of a panoramic FOV from the camera unit 122 (including the stereo camera 122a and/or the omnidirectional camera 122b). In some embodiments, the cameras 122 operate within a physical environment and are configured to acquire omnidirectional image data, and then send the acquired omnidirectional image data of the physical environment to the onboard processing array 110 for storage and/or processing. In some embodiments, the onboard processing array 110 may receive omnidirectional image data from a source external to the intelligent mobility aid device 100, such as via the antenna 142. The acquired omnidirectional image data may be in the form of digital video and/or one or more digital photographs.

The onboard processing array 110 segments the omnidirectional image data into a plurality of image slices. In one exemplary embodiment, the received omnidirectional image is segmented into eight slices (S1, S2, S3, S4, S5, S6, S7, and S8). In some embodiments, the omni-direction image may be segmented into any number of slices. The number of slices may be between 8 and 36. However, it should be understood that the number of slices may be less than 8 or greater than 36.

Each of the plurality of slices is representative of at least a portion of the panoramic field of view of the omnidirectional image data or the partially panoramic field of view of the omnidirectional image data. In some embodiments, the plurality of image slices includes a middle image slice (e.g., slice S2), a preceding image slice (e.g., slice S1), and a subsequent image slice (e.g., slice S3), such that a field of view of the middle image slice (e.g., slice S2) is adjacent to or overlaps a preceding field of view of the preceding image slice (e.g., slice S1) and the middle field of view of the middle image slice (e.g., slice S2) is adjacent to or overlaps a subsequent view of the subsequent image slice (e.g., slice S3).

Each image slice of the plurality of image slices is representative of an equal portion of the panoramic field of view of the omnidirectional image data and the collective fields of view of the plurality of image slices is the same as the panoramic field of view of the omnidirectional image data. For example, each of the eight slices captures an eighth of the full panoramic view of the omnidirectional image data and the collective field of view of the eight image slices is the same as the panoramic field of view of the omnidirectional image data. In some embodiments, the field of view of a first slice of the plurality of views may be greater than a field of view of a second slice of the plurality of slices. The collective fields of view of the plurality of slices may be smaller than the full panoramic field of view. Also, the field of views of neighboring slices may overlap.

The onboard processing array 110 calculates a slice descriptor for each image slice of the plurality of image slices. As used herein, "slice descriptor" refers to a description of the visual features (e.g., color, texture, shape, motion, etc.) of the image data of a particular slice of the omnidirectional image data. For example, a slice descriptor d1 is calculated for slice S1, a slice descriptor d2 is calculated for slice S2, a slice descriptor d3 is calculated for slice S3, a slice descriptor d4 is calculated for slice S4, a slice descriptor d5 is calculated for slice S5, a slice descriptor d6 is calculated for slice S6, a slice descriptor d7 is calculated for slice S7, and a slice descriptor d8 is calculated for slice S8.

In some embodiments, the slice descriptor may be calculated using an algorithm, such as scale-invariant feature transform ("SIFT"), speeded up robust feature ("SURF"), histogram of oriented gradients ("HOG"), generalized search tree ("GIST"), fast retina keypoint ("FREAK"), and binary robust invariant scalable keypoints ("BRISK"), and the like. However, it should be understood that other algorithms may be used to calculate the slice descriptor. In some embodiments, the slice descriptor may include a decimal vector. The slice descriptor may include a binary vector. In other embodiments, the slice descriptor may be represented in a format other a binary vector or a decimal vector. Depth information resulting from the application of stereo algorithms may also be used to calculate the slice descriptor.

The onboard processing array 110 generates a current sequence of slice descriptors for the omnidirectional image data received. The current sequence of slice descriptors includes the calculated slice descriptor for each image slice of the plurality of image slices. For example, node n1 includes the slice descriptor d1 corresponding to slice S1, node n2 includes the slice descriptor d2 corresponding to slice S2, node n3 includes the slice descriptor d3 corresponding to slice S3, node n8 includes the slice descriptor d8 corresponding to slice S8, etc.

In some embodiments, the current sequence of slice descriptors may be structured such that a middle node (e.g., node n2) corresponds to a middle image slice (e.g., slice S2), a preceding node (e.g., node n1) corresponds to a preceding image slice (e.g., slice S1), and a subsequent node (e.g., node n3) corresponds to a subsequent image slice (e.g., slice S3). The preceding node (e.g., node n1) is linked to the middle node (e.g., node n2), and the middle node (e.g., node n2) is linked to the subsequent node (e.g., node n3).

The current sequence of slice descriptors is stored in the memory 112. The memory 112 may include a database of reference sequences of slice descriptors, each of which corresponds to a previously processed omnidirectional image encountered by the onboard processing array 110.

The current sequence of slice descriptors may be stored in the memory 112 as a current linked list of slice descriptors. In embodiments in which the current sequence of slice descriptors is stored in the memory 112 as a current linked list of slice descriptors, each node of the linked list may be linked to the subsequent node of the linked list (e.g., node n1 is linked to node n2, node n2 is linked to node n3, etc.). In some embodiments, the current sequence of slice descriptors may be stored in the memory 112 as a circular linked list of slice descriptors, such that the first node is linked to the second node (e.g., node n1 is linked to node n2), the second node is linked to the third node (e.g., node n2 is linked to node n3), . . . , and the last node is linked back to the first node (e.g., node n8 is linked to node n1). In some embodiments, the current sequence of slice descriptors may be stored in the memory 112 as a current doubly linked list of slice descriptors. It should be understood that in other embodiments, the current sequence of slice descriptors may be stored in the memory 112 using a data structure other than a linked list, such as an array, and the like.

While the omnidirectional image received was not unwarped prior to segmenting the omnidirectional image, in other embodiments, the omnidirectional image may be unwarped prior to segmentation.

Returning to FIG. 4, at block 402, the machine readable instructions stored in the memory 112, when executed by the processor 111, may cause the onboard processing array 110 to access a reference sequence of slice descriptors in the memory 112. For example, in the embodiment depicted in FIG. 4, the reference sequence of slice descriptors includes a reference slice descriptor d3 corresponding to a reference node r1, a reference slice descriptor d4 corresponding to a reference node r2, a reference slice descriptor d5 corresponding to a reference node r3, a reference slice descriptor d6 corresponding to a reference node r4, a reference slice descriptor d7 corresponding to a reference node r5, a reference slice descriptor d8 corresponding to a reference node r6, a reference slice descriptor d1 corresponding to a reference node r7, and a reference slice descriptor d2 corresponding to a reference node r8.

Still referring to FIG. 4, at block 404, the machine readable instructions stored in the memory 112, when executed by the processor 111, may cause the onboard processing array 110 to determine whether the current sequence of slice descriptors matches the reference sequence. In some embodiments, whether the current sequence of slice descriptors matches the reference sequence of slice descriptors is determined by determining a current order of slice descriptors, determining a reference order of slice descriptors, and comparing the current order of slice descriptors to the reference order of slice descriptors. For example, a current order of slice descriptors in the embodiment depicted in FIG. 4 may be determined as {d1, d2, d3, d4, d5, d6, d7, d8}. A reference order of slice descriptors in the embodiment depicted in FIG. 4 may be determined as {d3, d4, d5, d6, d7, d8, d1, d2}. The current order of slice descriptors {d1, d2, d3, d4, d5, d6, d7, d8} may be compared to the reference order of slice descriptors {d3, d4, d5, d6, d7, d8, d1, d2} in order to determine whether the current order of slice descriptors matches the reference order of slice descriptors.

In some embodiments, the current sequence of slice descriptors is a current circular linked list of slice descriptors and the reference sequence of slice descriptors is a reference circular linked list of slice descriptors. In such embodiments, the current order of slice descriptors may be determined by traversing the current circular linked list of slice descriptors starting at a current starting node (e.g., the current order of slice descriptors may be determined to be {d1, d2, d3, d4, d5, d6, d7, d8} by traversing the current circular linked list starting from node n1 of the current circular linked list of slice descriptors). The reference order of slice descriptors may be determined by traversing the reference circular linked list of slice descriptors starting at a reference starting node (e.g., the reference order of slice descriptors may also be determined to be {d1, d2, d3, d4, d5, d6, d7, d8} by traversing the reference circular linked list starting from node r7 of the reference circular linked list of slice descriptors). The current sequence of slice descriptors matches the reference sequence of slice descriptors when the current order of slice descriptors is the same as the reference order of slice descriptors. In the embodiment depicted in FIG. 4, the current sequence of slice descriptors may be determined to match the reference sequence of slice descriptors because the reference order of slice descriptors when traversing the reference circular linked list of slice descriptors starting from node r7 is the same as the current order of slice descriptors when traversing the current circular linked list of slice descriptors starting from node n1.

Still referring to FIG. 4, at block 406, the machine readable instructions stored in the memory 112, when executed by the processor 111, may cause the onboard processing array 110 to estimate an orientation or position based on the current sequence of slice descriptors and the reference sequence of slice descriptors. For example, differences between the current sequence of slice descriptors and the reference sequence of slice descriptors may be used to determine a current position or orientation with reference to a known position or orientation associated with the reference sequence of slice descriptors. Standard filtering techniques, such as the extended Kalman filter, the particle filter, and the like may be used to determine the current position or orientation based on the comparison between the current sequence of slice descriptors and the reference sequence of slice descriptors.

Figure 5:
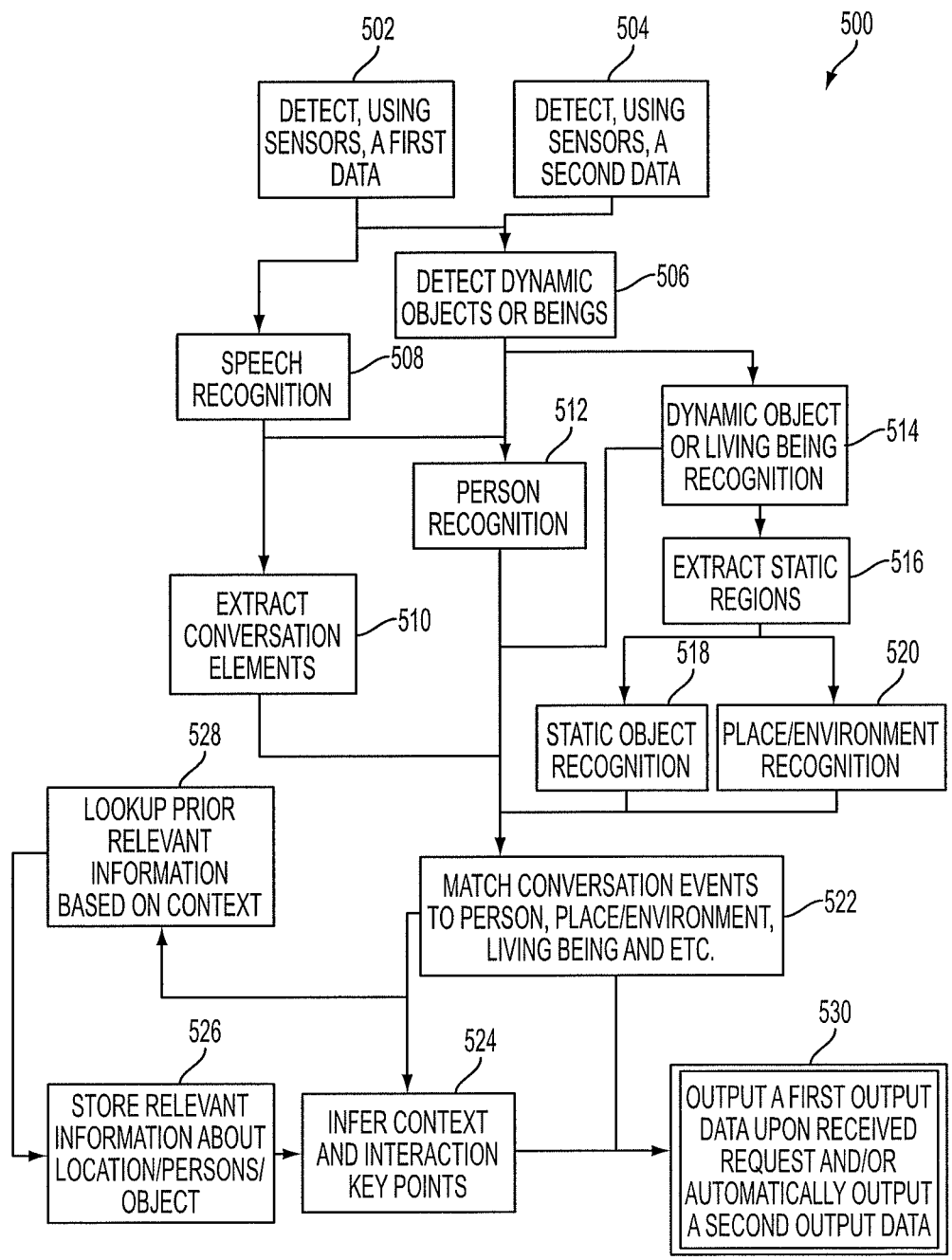
FIG. 5 is a flowchart for outputting first and/or second output data for providing assistance to a user of the mobility aid device according to an embodiment of the present invention.

FIG. 5 illustrates an exemplary method 500 for human interaction using the device 100. The method 500 is only an example of the detection and analysis or processing of the first detected data and/or the second detected data. The blocks of method 500 may be performed simultaneously or in various combinations of orders. In blocks 502 and 504, the first data and the second data are detected using the camera unit 122 (including the stereo camera 122a and/or the omnidirectional camera 122b) and/or additional sensor 125. The degree to which data can be collected regarding the surrounding environment of the user and matters therein may depend on what or which camera 122 and/or additional sensor 125 are available and the processing limitations of the processor 111 and/or the external device and/or cloud. As such, the method 500 may be adjusted accordingly in real time by monitoring such limitations.

The processor 111 may work in concert with the camera unit 122 (including the stereo camera 122a and/or the omnidirectional camera 122b) and/or additional sensor 125 for improving collection of the first detected data and/or the second detected data. The processor 111 may also consider whether the user or a person is requesting or attempting to convey information. For example, if a user is making a facial expression without speech to communicate with the device 100, the processor 111 can direct the speaker 132 to pose follow-up questions or inquiries in order to supplement or clarify the detected data. For example, the method 500 may direct an output speech to be generated, thereby asking the user to clarify the facial expression. The user may then respond in a voice command clarifying the conveyed information. In other embodiments, this facial expression recognition setup may be performed by a person other than the user.

In block 506, the method 500 detects dynamic objects or beings. In one embodiment, the method 500 may detect movement, changes in a scene or other dynamic regions as observed by cameras in order to focus the camera unit 122 and/or additional sensor 125 on the detected dynamic regions. The processor 111 classifies the detected dynamic region as described below.

For example, detection of a person, living being, and/or a dynamic object may be performed by looking for changes in data detected by the camera unit 122 and/or additional sensor 125. Changes in data received from the camera unit 122 and/or additional sensor 125 may be identified by first estimating the motion of the device 100 using the GPS unit 124, the IMU 123 or techniques such as visual odometry which allow estimation of the motion of a camera by tracking corner or blob features between two camera frames. As such, the device 100 may identify motion in the surrounding environment of the user which does not correspond to the motion of the device 100.

Upon identifying the changing parts of the scene within the first detected data and the second detected data, the device 100 seeks to recognize the changing elements, using techniques such as "eigenfaces" and "skeletal recognition" to recognize persons and faces. Additionally, standard techniques like Support Vector Machines, Deformable Parts Model and dynamic programming can be used to learn different models for various object/person classes. The types of features that can be used in these recognition tasks can be any combination of features like SIFT (Scale-Invariant Feature Transform), SURF (Speeded Up Robust Features), Gist modeling, Sobel, Fast, and other features and/or techniques that enable the method 500 to recognize a person, object, living being, or place/environment within a proximity of the user.

Thus, by detecting the dynamic regions, a new person entering the environment within the proximity of the user may be detected in block 512 and a dynamic object or being can be detected in block 506 and classified by the processor 111 accordingly. Simultaneously or thereafter, the device 100 extracts the remaining static regions in block 516. In one embodiment, in block 516, additional second detected data are collected from static objects in block 518 and from an environment or place within a proximity of the user in block 520.

The microphone 131 may communicate with a speech recognition module to detect speech, conversation or interaction as shown in block 508. The device 100 may further extract conversation elements containing useful data in block 510. In block 522, the processor 111 matches extracted conversation or speech elements from block 510 to the detected person, object, living being, place/environment, or combinations thereof.

In block 528, the method 500 looks up prior relevant information or learned data based on context and based on the matched conversation events from block 522 regarding the person, object, living being, place/environment, or combinations thereof. In block 526, the processor 111 stores relevant information for later use in the memory 112 based on prior relevant information. For example, if the processor 111 detects facial features of a person entering the environment and also detects that the new person is speaking, the speech elements can be matched with the new person. Speech data related to the person may be stored in the memory 112 for later use. The microphone 131 may include a 3-D microphone or a microphone array to localize the origin of the sound or voice. The device 100 can track and log data related to the person in order to supplement the first detected data. The method 500 may actively and automatically output a second output data in block 350 based on the matched conversation events to the corresponding person, place/environment, living beings, or combinations thereof of block 522 and further based on the inferred context and interaction key points from block 524.

The processing of data (e.g., in blocks 506-350) can be performed by continuously analyzing data gathered by the camera unit 122 and/or additional sensor 125 in real time. The external device and/or cloud may be utilized due to restraints on the information storage capacity of the memory 112, energy capacity challenges associated with processing using solely the processor 111, and processing power limits of the processor 111. However, in one embodiment, both on-board and off-board processing capabilities are utilized to prepare for events in which the on-board processing may be preferable (e.g., a poor connection in cloud communications) to ensure a minimal level of capability. For example, if the method 500 is implemented in a robotic device/platform that may not have sufficient capacity to perform the blocks described herein, the external device and/or cloud can provide assistance in sharing the load of the processing.

In block 530, the processor 111 may passively output, using the speaker 132, a first output data upon an input/request received by the processor 111 or a predetermined or scheduled event stored in the memory 112.

The processor 111 may further actively and automatically output, using the speaker 132, a second output data based on the first detected data and/or the second detected data, the previously detected, processed, and stored first and/or second data, the pre-programmed algorithm stored in the memory 112.

As discussed above, the interface array 130 communicates with the user or another person based on the detected data. The interface array 130 may communicate via the display 135 or a projection system in communication with the processor 111. The display 135 or projection system may be positioned on a remote device, such as a cellular telephone wirelessly connected to the device 100. The interface array may also communicate via the speaker 132.

The output images/videos may be displayed using an LCD, an organic light emitting display, a plasma display, light-emitting diodes, or any other display mechanism for displaying the output images/videos.

Figure 6A:
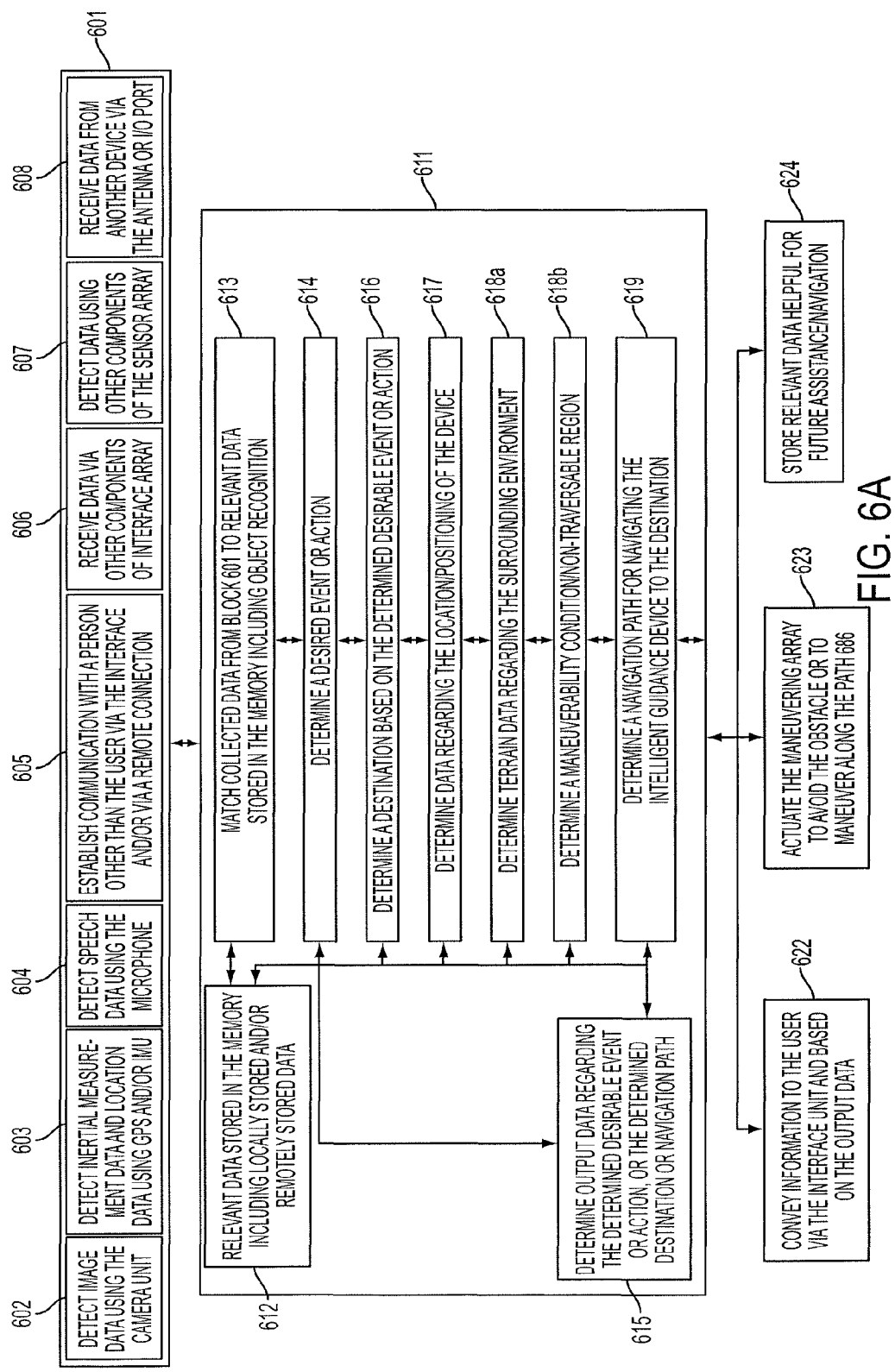
FIG. 6A illustrates an exemplary method for navigating a mobility aid device and/or providing helpful information to a user of the mobility aid device based on detected data according to an embodiment of the present invention.

FIG. 6A illustrates an exemplary method for navigating a device 100 and/or providing helpful information to a user of the device 100 based on detected data. A method for navigating a device 100 and/or providing helpful information to a user does not require that all of the blocks illustrated in FIG. 6A be utilized. Additionally, functions represented by the blocks can be performed in any order.

Block 601 refers to various methods of data collection using the device 100. In block 602, the device 100 may detect image data using the camera unit 122. The image data may correspond to the surrounding environment, objects or living beings therein, the user, and/or other surrounding elements. For example, the image data may be associated with the shape of a room or objects within the room. As another example, the device 100 may detect image data including facial recognition data.

In block 603, an IMU 123 is coupled to the platform and configured to detect inertial measurement data corresponding to a positioning, velocity, or acceleration of the device 100. A GPS unit 124 is configured to detect location data corresponding to a location of the device 100.

In block 604, speech data or audio data is detected using the microphone 131. This information may be information associated with the user, with the environment, with other people, actions, events, and various other items regarding social interaction and the surrounding environment. For example, when in a particular room, the device 100, via the interface array 130, may receive information from the user or another person, such as the type of room (i.e., "this is the living room"). As another example, a user may want to name or add information regarding a particular person. In this instance, the device 100, via the interface array 130, may receive information from the user such as to name the person (i.e., "he is Johnny"). Alternatively, the processor 111 may actively infer this information by parsing a conversation with the other person, without a user input that is directed to the device 100.

Referring to another example, the user may provide input to the device 100 that the user is performing a particular action, such as going to lunch. As another example, the user may provide input to the device 100 that a hazard exists at the current position and a description of the hazard. Alternatively, the processor 111 may actively infer this information by parsing conversations, analyzing detected image data, etc. as discussed above with respect to FIG. 5 and as discussed further below. The processor 111 parses a conversation of the user or another person into speech elements. The processor 111 analyzes the speech elements based on the previously determined user data. The processor 111 then determines a desirable event or action further based on the analyzed speech elements.

The data may further include a request. This request may be, for example, a request to identify a person, identify a room, identify an object, identify any other place, navigate to a certain location such as an address or a particular room in a building, to remind the user of his current action, what color an object is, if an outfit matches, where another person is pointing or looking, etc. The output of block 614 (determining a desirable event or action) or of block 616 (determining a destination) can be based on the requested information. Although speech data is discussed with respect to block 604, the information can be gathered using any combination of components of the interface array 130 and/or the sensor array 120.

In block 605, the processor 111 may establish communication with a person other than the user via the interface array 130 and/or via a connection with a remote device. The remote connection may be established via a wireless communication antenna 142, as discussed further below.

The processor 111 may determine whether communication with a person other than the user is desirable or requested. For example, when the detected data suggests that the user requires an opinion of another person, a communication channel may be established with a device of another person. For example, when the detected speech regarding an outfit of the user, facial recognition data regarding the user being indecisive or wondering about what to wear, and/or perceived action of a user in front of a mirror indicate that the user needs fashion advice from another person, a video teleconference between the user and a friend of the user may be established. From prior conversations/interactions, the processor 111 may have previously stored a user's friend's contact information. The processor 111 may categorize types of friends of the user and recognize that this communication needs to be with a friend that the user is comfortable with. The processor 111 may output data to the user letting the user know that a video conference or teleconference will be established with the friend. The device 100 may provide a video connection to a friend of the user or send a picture of the outfit to a friend of the user. In this example, the friend may provide a response as to whether or not the outfit matches. The friend may also assist the user in finding an alternate outfit that matches.

In block 606, data is received from the user, the environment, and/or other objects/beings via the interface array 130. For example, data may be detected from a touch-screen display 135, from a keyboard or buttons of an input device 134, or other devices capable of interfacing with the user or another person to receive input data.

In block 607, data may be detected using other components of the sensor array 120. For example, data may be detected from the encoder 121, or additional sensors 125 as discussed above. This information may be information associated with the user, with the environment, objects within the environment, and/or with other living beings/people.

In block 608, the device 100 may also receive data from another device using the antenna 142 or the I/O port, such as data regarding a map of a building, or any other data. Data may be shared among the device 100, other devices of the user (for example, a portable electronic device of the user such as a smart phone or tablet), a remote server, or devices of others connected and with permission to access (for example, devices of the friends of the user).

In block 608, data is retrieved via the antenna 142 and/or I/O port 143. This data may be information indicating to the device 100 that the user should be performing a particular set of actions. For example, the user may be in a hospital. The received information may be processed real time or stored for later use in the memory 112. The information may relate to mealtimes of the user. The device 100 may then know that the user is to eat lunch at 12:00 pm in the cafeteria every day. As another example, the device 100 may access the user's cellular phone and download the user's schedule.

In block 611, the processor 111 matches collected data from block 601 to relevant data stored in the memory. This includes object recognition. The processor 111 recognizes an object in the surrounding environment by analyzing the detected data based on the stored object data and at least one of the inertial measurement data or the location data. The object data stored in the memory 112 can be obtained from block 612.

In block 612, the memory 112 stores relevant data locally and/or remotely. For example, locally stored data may be data stored in a memory coupled to the platform 161. For example, remotely stored data may include data accessed from a remote server or another device via the antenna 142 and/or I/O port 143. For example, a schedule of the user may be periodically transmitted to the device 100 via the antenna 142.

In block 613, the processor 111 matches collected data from block 601 to relevant data stored in the memory. This includes object recognition as discussed above. The processor 111 recognizes an object in the surrounding environment by analyzing the detected data based on the stored object data and at least one of the inertial measurement data or the location data. The retrieved data can include data stored in the cloud or the internet. The processor 111 determines what information is desirable to process the request. For example, if the user requested to be navigated to the living room, the device 100 may need to know where the living room is, a layout of an entire route from the user to the living room and any hazards that may be present. As another example, if the user asked if his clothes match, then the device 100 may need to know what type of clothes match, what colors match and what the user is wearing.

The processor 111 accesses the memory 112 to retrieve the information desired to process the request. For example, if the user requested to be navigated to the living room, the device 100 may retrieve the location of the living room, a layout of the route from the user to the living room and any known hazards.

The processor 111 may determine whether or not the memory 112 has sufficient helpful information regarding the detected data. For example, when the user requests walking directions between two points, and a layout of a route is not available in the memory 112, the device 100 may access the internet or the cloud via the antenna 142 and/or the I/O port 143 to retrieve this missing information.

In block 614, the processor 111 determines a desirable event or action. The processor 111 may determine a desirable event or action based on the recognized object, the previously determined user data, and a current time or day. Current day or time is relevant for determining the current desirable event, action, destination, speech, etc. as discussed below. The device 100 may determine whether or not the user should be at a particular location and/or performing a particular action at any given time. For example, the processor 111 may match a previously stored lunch event to a current date/time (i.e., noon). The processor 111 may also match the previously stored lunch event to a time before the event. For example, if the user is to have lunch at noon somewhere that is 30 minutes away, the processor may determine a match at 11:30 am. As another example, a desirable action may be to wear certain clothes with other matching items. A desirable event may be to go to lunch if the current day/time indicates that the user in a nursing home should attend a lunch gathering event.

In block 615, the device 100, via the interface array 130, may output data based on the inferred current desirable event, action/destination, etc. For example, if the inferred action is to find matching clothes, the processor may determine whether or not the outfit matches. As another example, if a destination is inferred, the processor may determine a viable navigation route for the user. The output may be, for example, a series of verbal phrases (i.e., step-by-step walking directions) via the speaker 132. The output may also be, for example, vibrations informing the user of the data. For example, a left vibration may signify to turn left, a right vibration may signify to turn right, a vibration in both right and left may signify to stop, a continuous vibration in both right and left may signify to slow down, or any other combination of vibrations may indicate any of these or any other command.

Discussion now turns to navigation of the device 100. In order to navigate the device 100, the processor 111 at least determines two sets of data: (I) data regarding positioning and/or location of the device 100 and/or the user and (II) data regarding the surrounding environment, persons, objects, living beings, etc.

Referring back to block 602, data regarding the surrounding terrain of the device 100 is detected using the camera unit 122. As discussed above, the blocks in FIG. 6A are not necessarily performed in the order shown. The processor 111 may determine that further image data is required to learn about the terrain after a destination is set. When navigating indoors, the standalone GPS units may not provide enough information to a blind user to navigate around obstacles and reach desired locations or features. The device 100 may recognize, for instance, stairs, exits, and restrooms and appropriately store them in the memory 112. Terrain information allows the processor 111 to determine areas that the device 100 can maneuver over and further determine non-traversable areas. For example, the walking aid device 100a has to physically fit along a selected path. For example, the stereo camera 122a may provide depth information of the surrounding environment and obstacles. Alternatively or in addition, one or more omnidirectional cameras 122b and/or additional cameras 122c may be utilized to provide information regarding the surrounding environment.

Referring back to block 603, data using the GPS unit 124 and/or IMU 123 is detected. This data can be used along with data obtained from the camera unit 122 to gain an understanding of the terrain.

In block 616, the processor 111 determines a desired destination based on the determined desirable action or event. For example, the intelligent mobility aid device 100 may direct the user to an empty seat, or may remember the user's specific seat in order to navigate the user away and subsequently return to the same seat. Other points of interest may be potential hazards, descriptions of surrounding structures, alternate routes, and other locations. Additional data and points of interest can be downloaded and/or uploaded to mobile devices and other devices, social networks, or the cloud, through Bluetooth or other wireless networks.

In blocks 617, 618a, and 618b, the processor 111 analyzes data obtained using the camera unit 122 based on the data obtained from the GPS unit 124 and/or the IMU 123, and vice versa. In block 617, information set (II) can be used to gain a better/more accurate understanding of the information set (I) and vice versa.

In block 617, the processor determines data regarding the location or positioning of the device 100 using at least one of image data, inertial measurement data obtained using the IMU 123, location data obtained using the GPS unit 124, and relevant stored data (for example, map data stored in the memory 112).

In block 618a, the processor 111 may analyze features of images collected using the camera unit 122 and recognize the environment objects using object recognition. For example, data collected by the IMU 123 can be used to determine the amount and speed of movement to improve accuracy of detection using data collected by the camera unit 122. In addition, the IMU 123 may indicate a direction in which the collected information is located. For example, if the IMU 123 indicates that the information is regarding objects from a direction above the device 100, the processor 111 can determine that the surface is more likely to be ceiling than ground.

In addition, data collected using the GPS unit 124 can enhance identification of data collected by the camera unit 122. For example, if the camera unit 122 provides an image of the building, the processor 111 can determine if the building is detected correctly by utilizing data regarding the location of the user in the world, because building types differ in different parts of the world.

The GPS information may be inadequate because it may not provide sufficiently detailed information about the surrounding environment. However, the GPS information can be utilized along with visual data from the camera unit 122 to draw inferences that are helpful to the user. For example, if the GPS information indicates that the device 100 is currently inside a building, and the camera unit 122 provides information regarding an object, the processor 111 can limit its search to objects that would rationally be inside the building. For example, if an image provided by the camera unit 122 appears like a truck, the processor 111 can rule out the possibility that the object is a truck based on the GPS information. In other words, it is more likely an image of a poster of a truck, because the poster can rationally be within a building and a truck cannot. The GPS unit 124 provides location information, which along with the inertial guidance information, including velocity and orientation information provided by the IMU 123, allows the processor 111 to help direct the user.

The memory 112 may store, for example, map information or data to help locate and provide navigation commands to the user. The map data may be preloaded, downloaded wirelessly through the antenna 142, or may be visually determined, such as by capturing a building map posted near a building's entrance, or built from previous encounters and recordings. The map data may be abstract, such as a network diagram with edges, or a series of coordinates with features. The map data may contain points of interest to the user, and as the user walks, the camera unit 122 (including the stereo camera 122a and/or the omnidirectional camera 122b) may passively recognize additional points of interest and update the map data.

In block 618b, based on the analyzed data, a maneuverability condition/non-traversable region is detected. For example, a non-traversable region may be a region where the device 100 cannot physically fit or cannot safely travel. For example, although a person may fit between two closely positioned tables, the processor is mindful of the size of the device 100, and recognizes that the device 100 cannot traverse in between two tables to reach a particular destination. For example, a rough terrain may be a muddy ground. On the other hand, if it were just an individual walking without a walking aid device, the individual could easily fit and walk through such maneuverability/terrain conditions.

In block 619, the processor 111 determines a path over which the device 100 can travel. The path excludes the detected non-traversable regions in block 618b. The device 100 may determine paths for navigation, which may be further modified for the user's needs. For example, a blind person may prefer routes that follow walls. Using the IMU 123 and/or the GPS unit 124 and additional sensors, the device 100 can determine the user's location and orientation to guide them along the path, avoiding obstacles.

For example, the path may be towards a desired object (empty chair) as discussed above. The device 100 may identify obstacles or paths for the user. Based on either the speed of the traveler or the intended direction of the traveler, the device 100 can filter down what the significant obstacles or potential paths are. The device 100 may then guide the user based on those significant obstacles or paths. Guidance may be, for example, auditory feedback or vibratory feedback, for either the path or objects to avoid.

In block 622, the output data from block 615 may be conveyed to the user using various outputs of the interface array 130. Multimode feedback is provided to the user to guide the user on the path. This feedback is also provided to guide the user towards the desired destination/object and is presented via a combination of speech, vibration, mechanical feedback, electrical stimulation, display, etc. With blind users, the processor 111 may keep the range of vision in mind when outputting information. A blind or partially blind person can identify most of the things that are less than three feet away using a cane. Objects and other items of interest more than 30 feet away may not be of utmost importance because of the distance.

While travelling along the path, the device 100 may inform the user about signs or hazard along the path. The vibration unit 133 and/or the speaker 132 provide audio and haptic cues to help guide the user along the path. For example, the speaker 132 may play a command to move forward a specified distance. Then, special audio tones or audio patterns can play when the user is at a waypoint, and guide the user to make a turn by providing additional tones or audio patterns. A first tone, audio pattern or vibration can alert the user to the start of a turn. For example, a single tone or a vibration from the left side of the device 100 may indicate a left turn. A second tone, audio pattern or vibration can alert the user that the turn is complete. For example, two tones may be provided, or the vibration may stop so that the left side ceases to vibrate, when the turn is complete. Different tones or patterns may also signify different degrees of turns, such as a specific tone for a 45 degree turn and a specific tone for a 90 degree turn. Alternatively or in addition to tones and vibrations, the device 100 may provide verbal cues, similar to a car GPS navigation command. High level alerts may also be provided through audio feedback. For example, as the device 100 reaches a predetermined distance—such as a foot or other value which may be stored in the memory 112 and may be adjusted—from an obstacle or hazard, the speaker 132 and/or the vibration unit 133 may provide audible alerts. As the device 100 gets closer to the obstacle, the audible alerts may increase in intensity or frequency.

As an example of the method illustrated in FIG. 6a, the user may give a voice command, "Take me to building X in Y campus." The device 100 may then download or retrieve from memory a relevant map, or may navigate based on perceived images from the camera unit 122 (including the stereo camera 122a and/or the omnidirectional camera 122b). As the user follows the navigation commands from the device 100, the user may walk by a coffee shop in the morning, and the device 100 would recognize the coffee shop. The device 100 may use this recognition and the time of day, along with the user's habits, and appropriately alert the user that the coffee shop is nearby. The device 100 may verbally alert the user through the speakers 132. The user may use the input device 134 to adjust settings, which for example may control the types of alerts, what details to announce, and other parameters which may relate to object recognition or alert settings. The user may turn on or off certain features as needed.

Figure 6B:
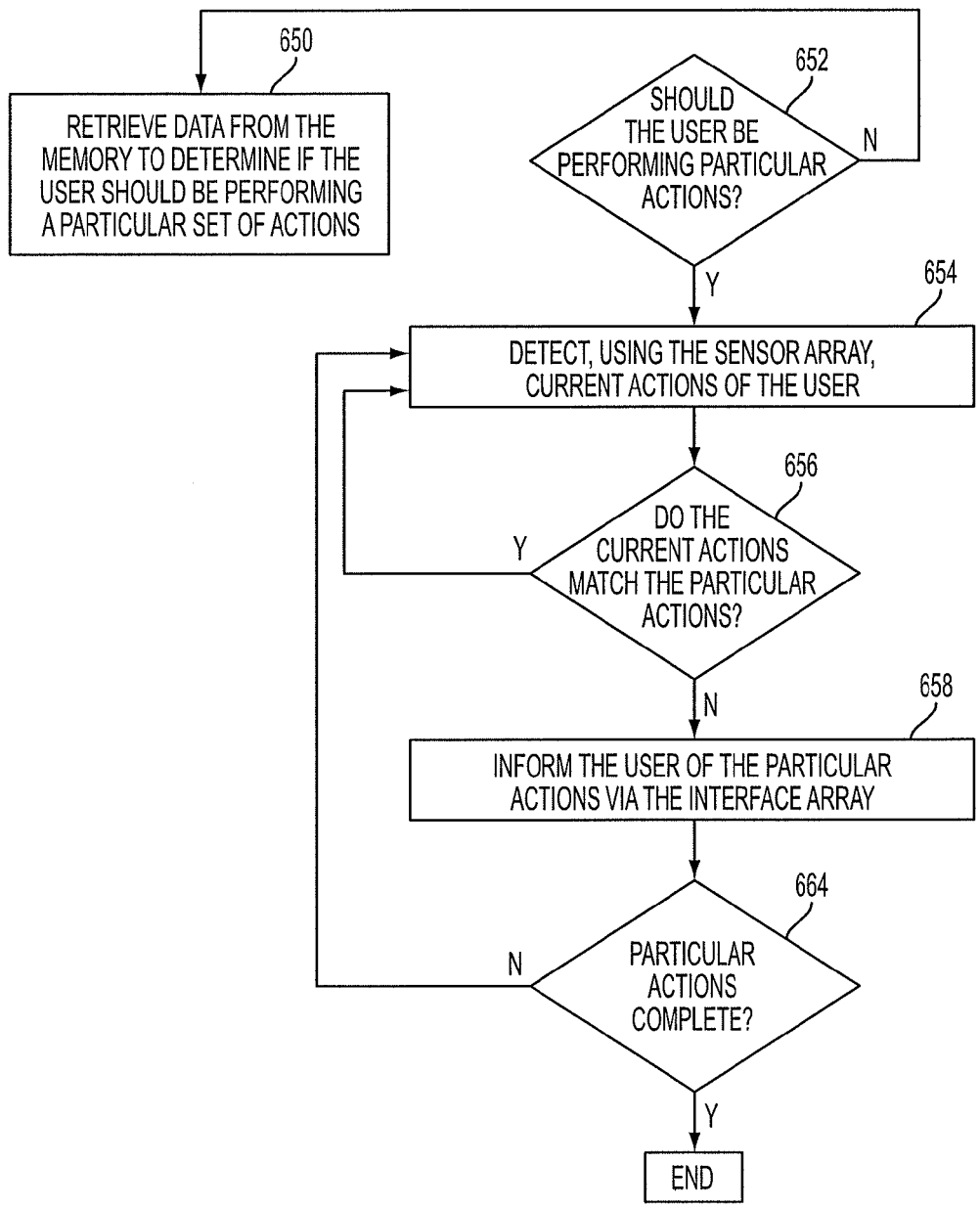
FIG. 6B illustrates an exemplary method for navigating a mobility aid device and/or providing assistance to a user of the mobility aid device based on a determined desirable event, action, and/or destination according to an embodiment of the present invention.

FIG. 6B illustrates an exemplary method for navigating the device 100 and/or providing assistance to a user of the device 100 based on an inferred current desirable event, action, destination, etc.

In block 650, data is retrieved from the memory 112 or via the antenna 142 and/or I/O port 143. This data may be information indicating to the device 100 that the user should be performing a particular set of actions. For example, the user may be in a hospital. In this example, assume that the memory 112 includes information related to mealtimes of the user. The device may then know that the user is to eat lunch at 12:00 pm in the cafeteria every day. As another example, the user may inform the device 100 of his/her schedule. For example, the user may inform the device that he/she has a meeting at 5:00 pm this Friday at 600 Anton Blvd.

In block 652, the device 100 may determine whether or not the user should be at a particular location and/or performing a particular action at any given time. If not, the process may return to block 650. If so, the process may proceed to block 654.

In block 654, data associated with the current actions of the user is detected by the sensor array 120. For example, the GPS unit 124 and/or the IMU 123 may sense that the device 100 is headed towards the cafeteria or towards 600 Anton Blvd. As another example, the microphone 131 may detect data indicating that the user is busy talking to another person.

In block 656, it is determined whether the current actions of the user match the particular set of actions from block 650. For example, if the user is not moving towards the cafeteria and he is supposed to be at lunch in 5 minutes, then the current actions do not match the particular actions. If the current actions do match the particular actions from block 650, then the process returns to block 654 to ensure that the user continues to perform the particular actions.

In block 658, the user is informed of the particular actions via the interface array 130. For example, if the device is travelling away from the cafeteria, the device 100 may provide data to the user that he should be going to lunch now. If the user does not begin the particular set of actions of block 650, then the device 100 may again notify the user after a predetermined amount of time. However, the device 100 may have learned when the user does not want to be interrupted. For example, the user may not want to be interrupted during a conversation. If the microphone detected that the user was having a conversation, the device 100 may wait until after the conversation to inform the user.

The device 100 may determine, via the interface array 130, whether or not the user needs more information. The device 100 may have previously learned preferences of the user, such as if he is wobbling back and forth, he requires directions. The device 100 may also request navigational information. For example, the user may request directions to the cafeteria. The user can provide data to the device 100 via the interface array 130 that he does or does not need more information. If the user does not require additional information, the process proceeds to block 664.

In block 664, the processor 111 determines whether or not the particular set of actions from block 650 is complete. If the particular actions are complete, then the process ends. If the particular actions are not complete, then the process returns to block 654.

An example of the process in FIG. 6B will now be provided. Assume that the user is supposed to be in the cafeteria for lunch. The device 100 may determine that the user is supposed to be in the cafeteria and that the user is not moving towards the cafeteria. The device 100 may then, via the interface array 130, provide feedback to the user, such as audio feedback that says, "time to go to lunch." The user may then return feedback to the device 100, such as "I'm not ready yet" or "let's go." If the user is not yet ready, the device 100 may remind the user again that it is lunch time after a predetermined amount of time. When he is ready, the user may provide data to the device 100 that he is ready to go.

The device 100 may then request feedback from the user to determine whether he needs directions or not. If the user responds no, then the device 100 may not provide any current information. However, if the user responds yes, then the device 100 may navigate the user to the cafeteria. The device 100 may also be configured so that it communicates with another device. For example, the device 100 may provide data to a terminal in the cafeteria that the user is on his way for lunch, so that his food can be prepared and a seat ready for him when he arrives. As the user arrives, the device 100 may provide additional data to the user such as where his table is and who he is sitting with.

In some embodiments, the device 100 may learn preferences of the user. For example, it may learn what chair the user normally sits at for lunch. In this example, the device 100 may determine where the user's normal lunchtime chair is. To do so, it may use sensed visual data from the camera unit 122, position data from the GPS unit 124, the IMU 123, and/or or any other detected data, as well as shape analysis as described above in regards to FIG. 2. Once the device 100 determines where the chair is, it may guide the user to the chair so that the user can safely get to the chair and sit down.

Referring to the entire processes discussed above with respect to FIGS. 6A-6B, the following examples are described.

As an example of the entire process, assume that the user is blind and attending a conference. The device 100 may store data detailing the layout of the building in which the conference is held. Further assume that the user is speaking with another attendee. During the conversation, the user asks the attendee about the location of the restroom. The attendee points in a direction. Because the user is blind, he cannot see the direction. The user may ask the device 100 where the attendee pointed, and the device 100 may inform the user of the direction. In some embodiments, the device 100 may learn that the user always wants to know when a person points and the direction of the point. The device 100 may also learn that when someone says "this way," the user wants to know the direction in which the person is indicating. In these embodiments, the device 100 may automatically provide the information to the user.

The user may then begin to walk in the indicated direction and ask the device 100 if there are any doors along the path. The device 100 may then inform the user that there is a door 100 ft ahead. The user may then ask the device 100 what type of doorknob the door has and where on the door the doorknob is located. The device 100 may then answer these questions as it continues to navigate the user to the restroom. The processor 111 may be mindful that the user is blind and automatically provide information about the door knob after recognizing the door knob shape using object recognition discussed above with respect to FIGS. 2 and 5. The navigation may continue until the user reaches the restroom. In some embodiments, the user does not need to request this information from the device 100, as the device 100 has learned the behavior and preferences of the user.

Referring to the conference example, assume that a presentation is about to begin on a topic in which the user is interested. When the user enters the presentation room, he may ask the device 100 to find an open seat. Using the object recognition method described in FIG. 2 above, the device 100 may determine where seats are, based on the object recognition function and current data detected by the sensor array 120. The device 100 may then determine, using the object recognition function, if a seat is empty by determining if data representing a person is detected in the seat. If the seat is not empty, the device 100 may proceed to determine if the next seat is empty. If it is not empty, then the device 100 may continue searching until it finds a seat that is empty. The device 100 may then navigate the user to the empty seat.

Still referring to the conference example, assume that the user was entranced with the presentation and wants to talk to the speaker at a later time. The user may provide input to the device 100 that the user wants the device 100 to remember the speaker. The device 100 may store data representing facial features of the speaker as well as identification information, such as name and title. Later that evening, if the user and the speaker are in the same room, the device 100 may detect visual data that is similar to the visual data saved for the speaker. The device 100 may then provide information to the user indicating that the speaker is in the room. The device 100 may also remind the user of any identification data of the speaker, such as name, position, company, etc. The device 100 also may access a database on the internet, cloud or memory to retrieve additional information about the speaker, such as where he is from, what his hobbies are, etc. The device 100 may provide this data and/or navigational data to the user.

In some embodiments, the device 100 may be configured so that it learns preferences of the user, such as what information to automatically provide to the user. For example, the user may always want to know where another person is looking or pointing. As another example, the user may always want to know when another person enters a room in which the user is present.

Figure 7:
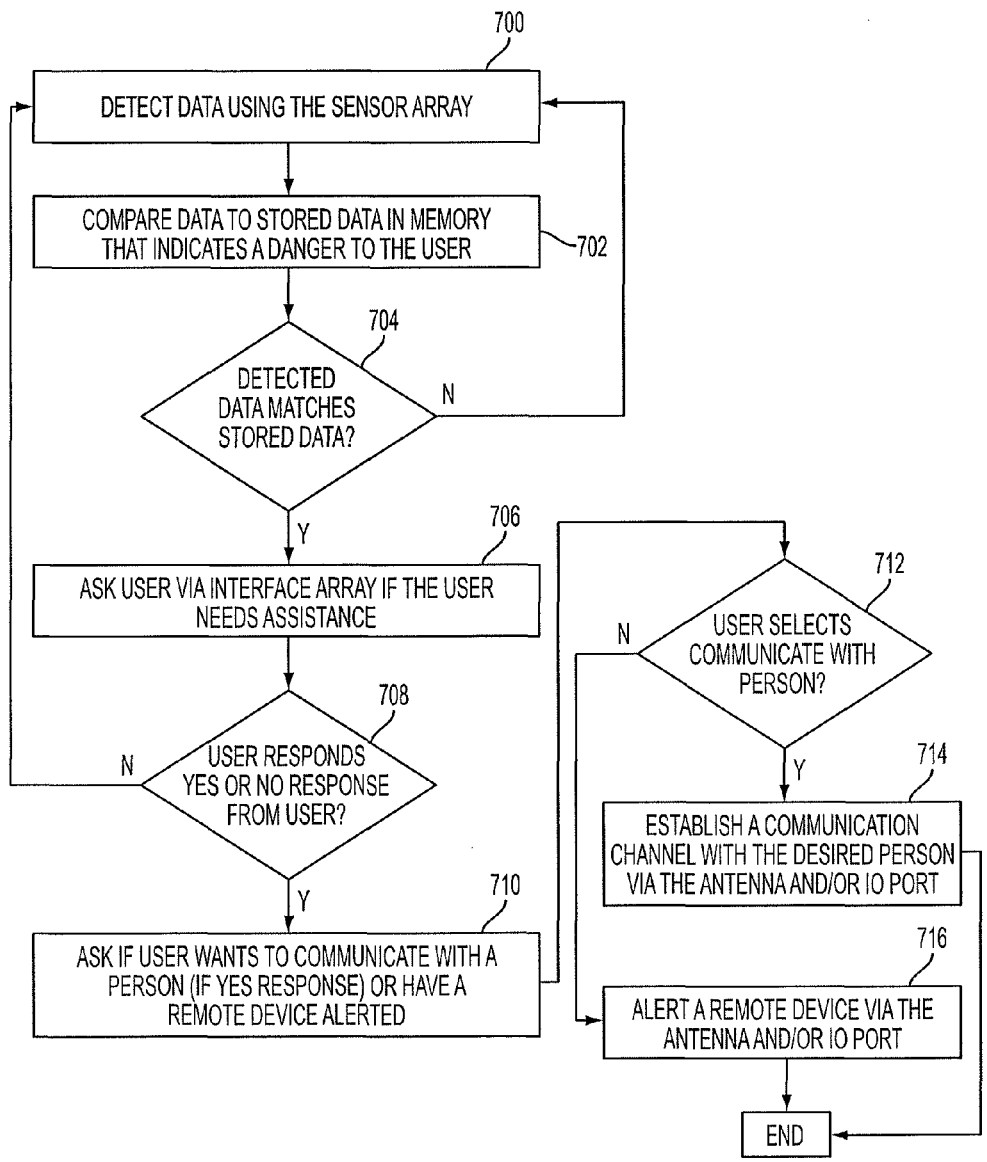
FIG. 7 illustrates an exemplary method for danger assistance by the intelligent mobility aid device according to an embodiment of the present invention.

FIG. 7 illustrates an exemplary method for danger assistance by the device 100. In block 700, data is detected by the sensor array 120. This data may be visual data, position data, or any other data that the sensor array can sense. For example, the IMU 123 may detect data indicating that the device 100 has tilted and user has fallen down as a result. The camera unit 122 may detect visual data such as a large object extremely close to the lens. The sensor array 120 may detect any other information such as data indicating a fire or a flood.

In block 702, the detected data is compared to data indicative of danger stored in the memory 112. This data in the memory 112 may be, for example, data associated with a falling motion of a user. The data may also be, for example, data associated with an object falling on the user. The processor 111 compares the data indicative of danger from the memory 112 to the detected data to determine if there is a match. For example, if detected data matches data indicating that a large object has fallen on the user, then a match exists.

In block 704, if no match exists between the data indicative of danger and the detected data, then the process returns to block 700 where data continues to be detected. If, however, a match does exist, then the process proceeds to block 706.

In block 706, the device 100 requests that the user provide information such as whether the user is ok. The user may provide this information via the interface array 130. This information may be, for example, a spoken "yes, I am ok," or "no, I am not ok."

In block 708, it is determined whether the user responded that he needs assistance, responded that he does not need assistance, or did not respond at all. If the user responded that he does not need assistance, then the process returns to block 700. If the user responded that he does need assistance or if the user did not respond to the inquiry, then the process proceeds to block 710.

In block 710, the device 100 may, via the interface array 130, request that the user provide information about whether the user wants to communicate with a person or to have a remote device alerted.

In block 712, it is determined whether or not the user selected to communicate with a person. If the user selected to communicate with a person, then in block 714, a communication channel may be established between the user and the desired people/person. Additionally, the user may select whom he wants to speak with. For example, he may wish to contact his personal physician, the police, a friend, or any other person or service. The device 100 may also have learned with whom to open a communication channel. For example, if fire data is detected, the device 100 may open a communication with a fire department or "911" call center.

The communication may be established, for example, by connecting the device to a cellular device via the antenna 142 and/or the I/O port 143. After the connection is established, the device 100 may cause the cellular device to place a video call or a voice call to the requested person or institution. The microphone 131 of the device 100 may act as the device for the cellular device and the speaker 132 of the device 100 may act as the speaker of the cellular device. Once the communication is established, the user may communicate with the requested person and provide information. The device 100 may also provide information to a device on the other end of the communication, such as any data associated with the danger, any location data, etc. Any information may also be communicated via Wi-Fi, Bluetooth, etc. elements of the device 100. For example, the device 100 may establish a VoIP connection via Wi-Fi. The communication may also be an image/video communication using the camera 122 and/or the display 135.

If in block 712, the user did not select to communicate with a person, or the user did not respond, the process may proceed to block 716.

In block 716, a remote device is alerted of the danger via the antenna 142 and/or the I/O port 143. This alert may consist of any data captured around the time of the incident, any location data, etc. The alert may be communicated by a connection to a cellular device via the antenna 142 and/or the I/O port 143, Wi-Fi, Bluetooth, etc.

Figure 8A:
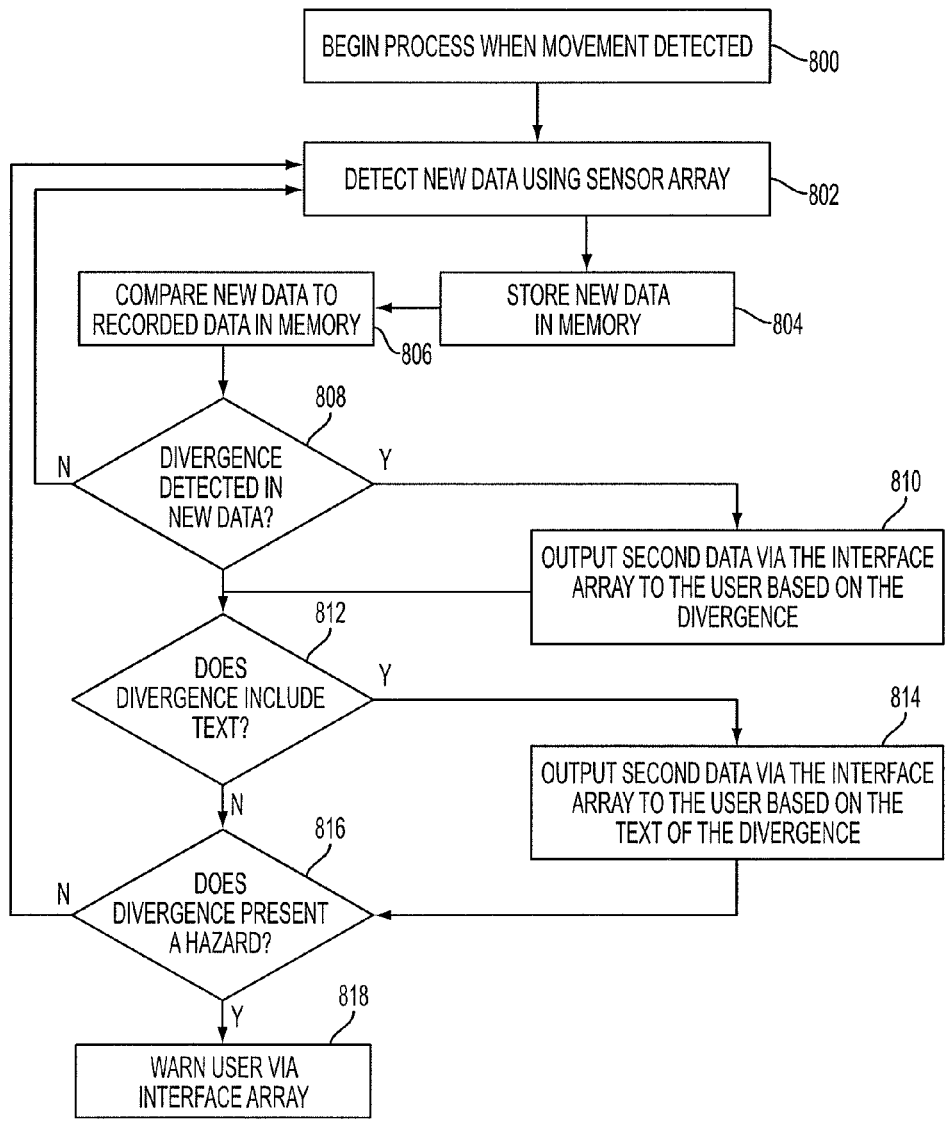
FIG. 8A illustrates an exemplary method for safety monitoring and alerting using the intelligent mobility aid device according to an embodiment of the present invention.

FIG. 8A illustrates an exemplary method for safety monitoring and alerting using the intelligent mobility aid device 100. The process begins in block 800 when movement is detected by the device 100. This movement may be detected, for example, by the IMU 123 or the GPS unit 124. After the process begins, in block 802, new data is detected by the device 100 using the sensor array 120. This data may include any data detected by the sensor array 120, such as visual data (streets, sidewalks, people), position data (location of the user, direction of travel), audio data (such as a moving car sound, a siren, an alarm), or any other data. In block 806, this new data is stored in the memory 112.

In block 806, this new data is compared to data recorded in the memory 112. The data recorded in the memory 112 may include data captured at the same location at a previous time. The data recorded in the memory 112 may also include data captured at the same location or nearby at a time prior to the current time, such as milliseconds, seconds, or minutes prior to the current time. The processor 111 may make this comparison using the object recognition method of FIG. 2.

In block 808, it is determined whether or not a divergence is detected between the new data and the data recorded in the memory 112. This divergence may include, for example, data indicating that a new object is in the field of view of the device 100 that was not previously detected or that a lack of an object is in the field of view that was previously present. The divergence may also include, for example, a new sound, such as a police siren.

In block 810, if a divergence is detected in the new data, a second data may be output to the user via the interface array 130 based on this divergence. As an example, assume that a divergence includes a boulder in the middle of the sidewalk. In this example, the device 100 may provide data to the user indicating the divergence. For example, the device 100 may, using the speaker 132, inform the user that an object matching the shape of a boulder is 10 feet directly ahead of the user. Alternately or additionally, the device 100 may provide haptic feedback to the user based on the divergence.

In block 812, it is determined whether or not the divergence includes text. For example, the divergence may be a sign or police tape including text. The processor 111 may make this determination by comparing the new detected data to data indicating the shape of text characters to determine if any matches exist.

In block 814, if is determined that the divergence includes text, then the device 100 may output data to the user via the interface array 130 based on the text of the divergence. For example, the data may include audio data indicating the content of the text of the divergence.

In block 816, it is determined whether or not the divergence presents a hazard. The memory 112 may have stored data which can be compared to detected data in order to determine if a divergence is hazardous. For example, the memory 112 may have stored therein visual data associated with a bobcat and an indicator that a bobcat is hazardous. As another example, the memory 112 may have stored therein visual data associated with the shape of a caution sign and the word caution, and that this data is an indicator of a hazard.

As another example, instead of having data representing a dangerous object, the memory 112 may store situational data. An example of situational data is that the device 100 may recognize that if a large object is in the middle of a sidewalk that the device 100 is travelling along, the object may present a hazard. Another example of situational data is that the device 100 may recognize that if visual data of an area had been previously sensed and stored, and the visual data of the area is significantly different in the present sensing of the area, then a danger may exist.

In block 818, if it is determined that the divergence does present a hazard, the device 100 may warn the user via the interface array 130. The warning may include, for example, an output via the speaker 132 informing the user that a hazard exists and the location of the hazard. The device 100 may also output, for example, the type of hazard. If the device 100 detected a caution sign that read "potholes in the sidewalk," then the device 100 may output data to the user informing the user that potholes exist in the sidewalk. The device 100 may also inform the user of the locations of the potholes as the device 100 detects them. In some embodiments, the device 100 may provide vibrational data to the user via the vibration unit 133. For example, as the user approaches a hazard, the vibration unit 133 may produce increasingly frequent vibrations.

Figure 8B:
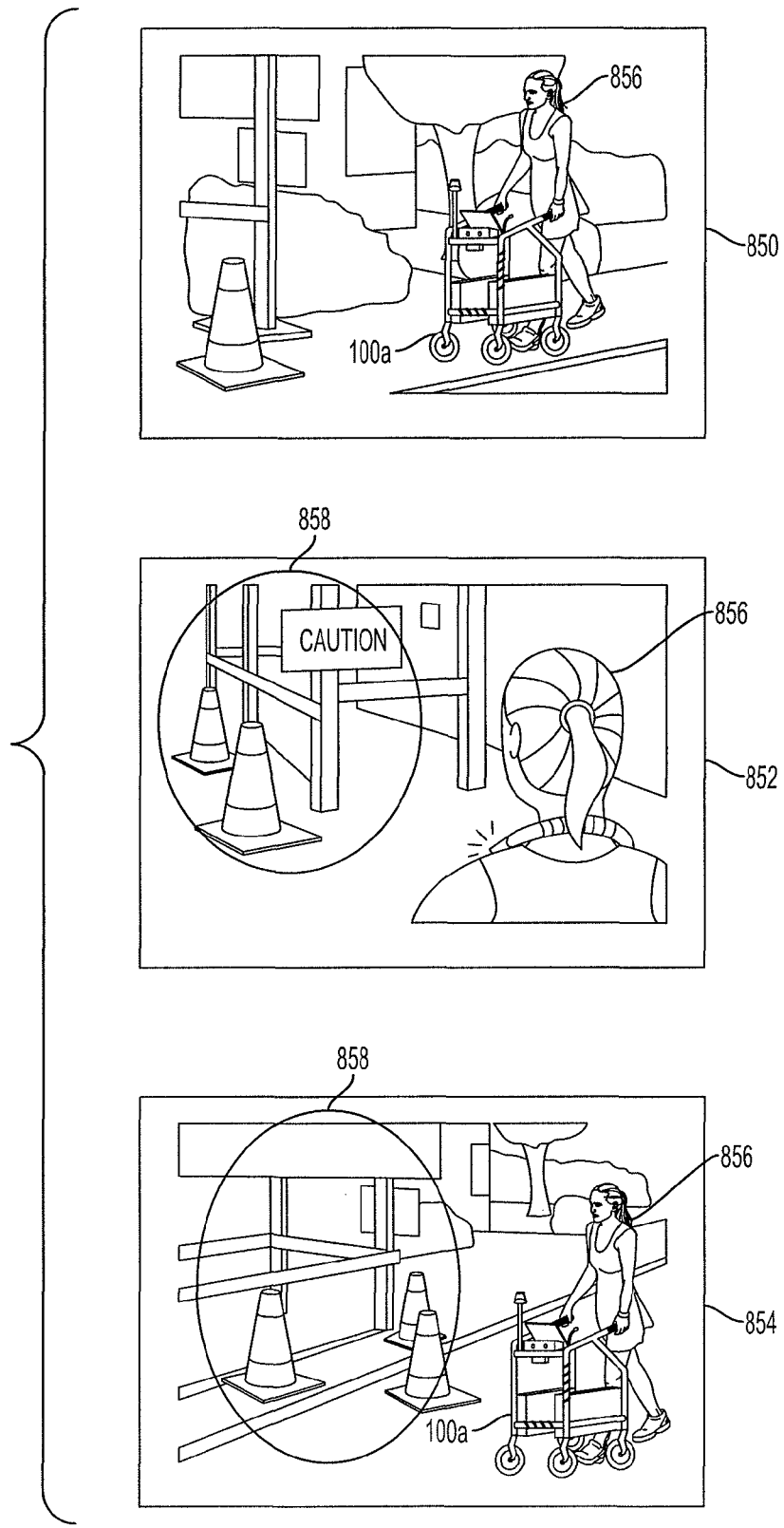
FIG. 8B illustrates an example of the method of FIG. 8A according to an embodiment of the present invention.

FIG. 8B illustrates an example of the method of FIG. 8A. In frame 850 of FIG. 8B, a user 856 is travelling using a walking aid device 100a along a sidewalk. Assume that the user has previously traveled along the sidewalk and the memory 112 may have stored therein data detected by the sensor array 120 during the previous trips along the sidewalk.

In frame 852, a hazard 858 is present on the sidewalk in the direction of travel of the walking aid device 100a. The hazard includes a caution sign as well as two caution cones. When the hazard is in the field of view of the walking aid device 100a, the processor 111 may compare the detected data to stored data. The processor 111 may then determine that the hazard is a divergence and it may provide data to the user 856 based on the divergence. The data may include, for example, a description of the two cones, the fact that a sign is present and any other large diversions. The walking aid device 100a may also detect that the diversion includes text of "CAUTION." The walking aid device 100a may provide the user 856 data based on the text, such as reading the text to the user.

The walking aid device 100a may have learned that a caution sign or a caution cone presents a hazard, and determine that the caution sign and/or the caution cone present a hazard. The walking aid device 100a may also determine this by identifying that the divergence is significant. The walking aid device 100a may use the fact that the sign and/or cones are positioned in a direction of travel of the walking aid device 100a to determine that they present a hazard. The walking aid device 100a may then provide data to the user 856 indicating that the hazard 858 is present. The walking aid device 100a may, for example, output the type and/or location of the hazard 858 to the user 856 using the speaker 132. The walking aid device 100a may also, for example, vibrate with increasing frequency as the user approaches the hazard 858.

For example, in frame 854, the user may utilize the output from the walking aid device 100a to navigate around the hazard 858. The walking aid device 100a may vibrate more on one side than another to indicate the location of the hazard 858. In frame 854, the hazard is more to the right side of the user 856 than the left side. So, the right handle bar may vibrate more than the left handle bar, indicating that the hazard is on the right. Alternately, the walking aid device 100a may vibrate less on the right handle bar than on the left handle bar, indicating that it is safer on the left side. Alternatively or in addition, steering, motorized control, or braking may be applied to the walking aid device 100a to avoid the hazard.

Figure 9:
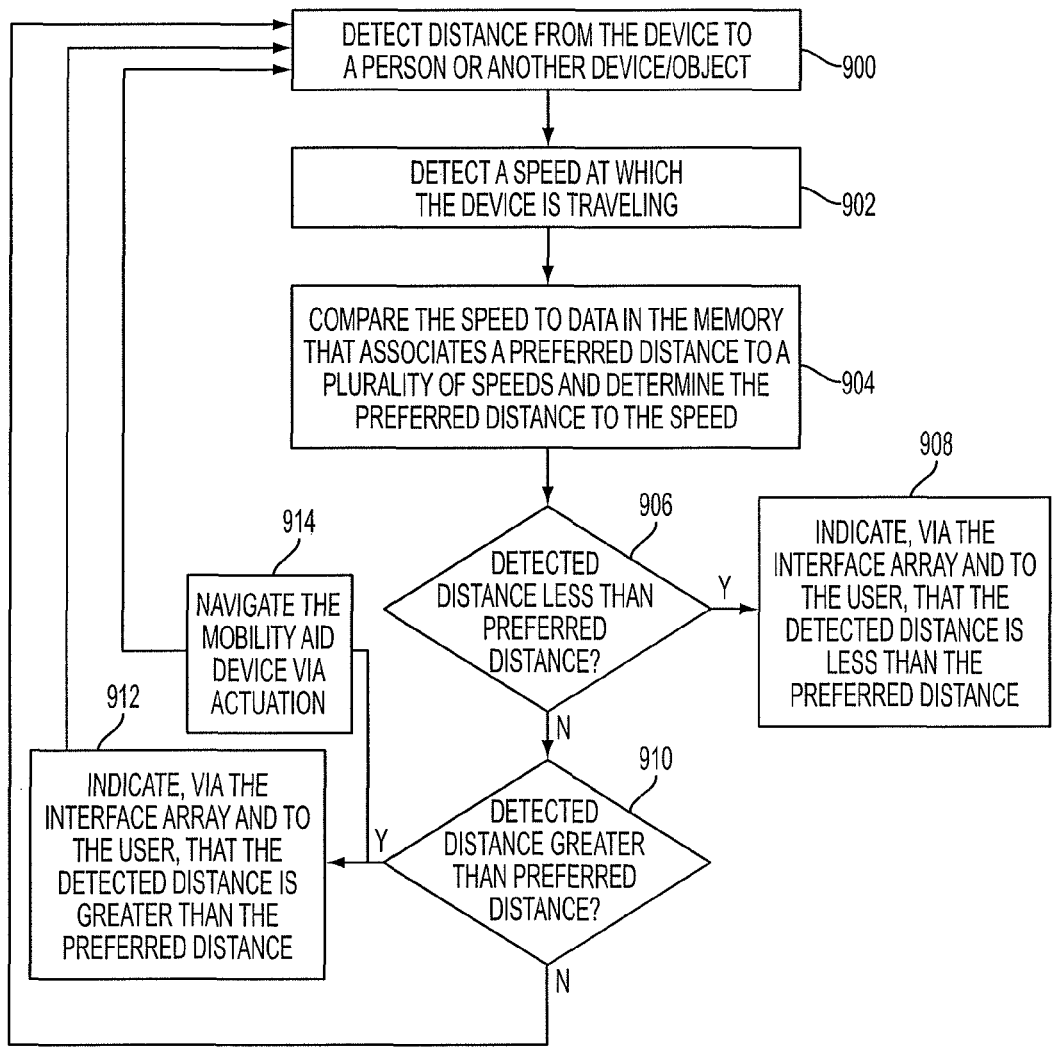
FIG. 9 illustrates an exemplary method for providing navigation assistance to a user of the mobility aid device according to an embodiment of the present invention.

FIG. 9 illustrates an exemplary method for navigation assistance. This method may be used, for example, to inform a user when he should move the device 100 forward in line. It may also be used, for example, to inform a user of when he should slow down or speed up the device 100 based on another mobility aid device. This method may also be used, for example, to inform a user of when he should slow down or speed up the device 100 so that he can travel at the same pace as his friends (whether walking or travelling with another mobility aid device).

In block 900, the device 100, using the sensor array 120, detects a distance from the device 100 to a moving object, such as a person. The object can be in any relative position to the user so long as it is in the field of view of the camera unit 122. The device 100 may also, in some embodiments, determine a speed at which the object is moving.

In block 902, the processor 111 may determine a speed at which the device 100 is traveling, using the sensor array 120. Using the speed data, as well as other data, the processor 111 may determine a set of actions that the user is performing. For example, the user could be using device 100 to move along with friends. He also could be waiting in a line, or moving down the street to get to a gathering. The processor may utilize the detected data to determine the action of the user.

In block 904, the processor 111 compares the speed and other data to data in the memory 112. The data in the memory 112 may, for example, associate speed and other data to a preferred distance of device 100 to an object. For example, if the user is traveling using the device 100 alongside his/her friends, the preferred distance may be relatively short. As another example, if device 100 is travelling at a higher speed, the preferred distance may be relatively long so that the device 100 does not accidentally run into the object.

In block 906, it is determined whether or not the detected distance is less than the preferred distance. This may be useful, for example, when device 100 is travelling down the street faster than another mobility aid device, or has prematurely started when waiting in a line.

If the detected distance is less than the preferred distance, then the method proceeds to block 908. In block 908, the device 100 outputs data to the user, via the interface array 130, indicating that the detected distance is less than the preferred distance. This data may include, for example, audio data or haptic data. For example, the device 100 may vibrate with increasing frequency as the user approaches the object.

In block 910, it is determined whether the detected distance is greater than the preferred distance. This may be useful, for example, if the user is travelling on the device 100 alongside friends and is moving at a faster pace.

If the detected distance is greater than the preferred distance, then the process proceeds to block 912. In block 912, the device 100 outputs data to the user, via the interface array 130, indicating that the detected distance is greater than the preferred distance. This data may include, for example, audio data or haptic data. For example, the device 100 may vibrate with increasing intensity as the distance between the user and the object/person grows. In some embodiments, there are only certain situations in which the device 100 will alert the user that the distance is greater than the preferred distance. For example, if the user is travelling on the device 100 alone, he will not care if he is far away from other walkers. As such, the device 100 may not provide any data.

In certain embodiments, in block 914, the device 100 may be actuated automatically (using braking, steering, and/or motor control discussed above) to slow down. Optionally, the actuation may be performed based on safety of actuation under the circumstances. The actuation may be performed based on detected data regarding the speed/positioning of the device 100 with respect to the surrounding environment and/or obstacles.

Figure 10A:
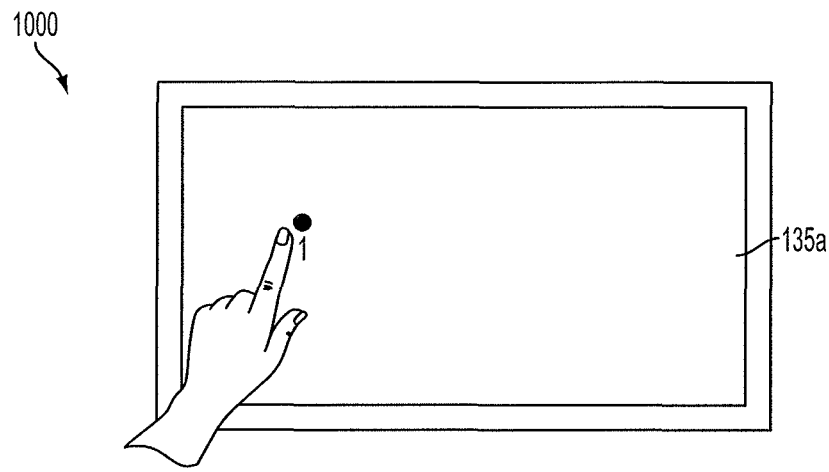
FIGS. 10A-10C show a touch-screen display of the intelligent mobility aid device according to an embodiment of the present invention.
Figure 10B:
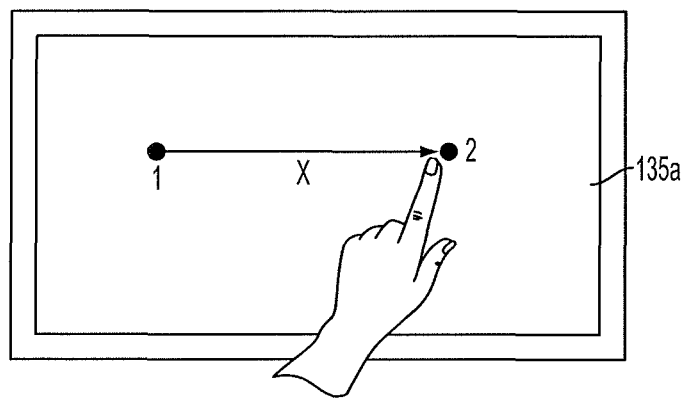
Figure 10C:
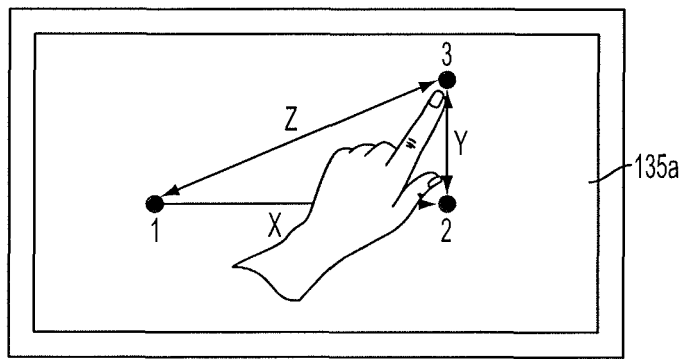

FIG. 10A shows a touch-screen display 135a that can be utilized in the device 100. A user may deliver an input to touch-screen display 135a, such as by touching touch-screen display 135 at a random location $(x_1, y_1)$, for instance location 1 with the x axis being horizontal and the y axis being vertical. As disclosed herein, horizontal and vertical directions could be determined through accelerometers or set based on hardware, and/or user defined. Responsive to this touch, a note, such as note F2 is played. The user may then touch the screen at location $(x_2, y_1)$ with some relative offset in the x and/or y direction (this offset can be zero as shown in FIG. 10B with respect to the y axis) and a new note is played based on the relative offset from location 1 (distance X). For example, in the case of a positive x displacement, in this case to the right of the first touch, the note A2 could be played. Timing between the touches can also be recorded and used as information in the action and response selection. Likewise, according to various embodiments, the user may build a sequence of notes to perform a certain gesture. According to various embodiments, the user may build a sequence of touches and/or slides/drags to perform a certain gesture. The end of the series/sequence may be determined by a sufficient amount of delay with no further input. Another form of relative offset is a move in the y direction. In this case, a complete shift of key may designate the relative offset in the y direction (See FIG. 10C to location 3). The relative offset of location 3 may be calculated from location 1 (distance Z) and/or calculated from the previous touch, such as location 2 (distance Y).

According to various embodiments, the touch-screen display 135a may toggle between an interface that uses visual cues, such as icons that are tapped and/or dragged to a system that uses relative offset based touch navigation. For instance, in response to a received signal, such as a user tapping the screen three times in rapid succession in the same location, icon based interaction may be temporarily disabled and relative offset navigation may be enabled. Other sources of transition (e.g., to the toggle touch-screen display 135*a* to receive relative offset commands) may include receiving speech input, selectable virtual buttons or physical buttons, such as those placed on a steering wheel or on and/or coupled to the device 100. For instance, after a user toggles the touch-screen display 135*a* to receive relative offset commands (e.g., taps touch-screen display 135*a* three times and/or a single tap and hold for a predetermined length of time), the generally selectable icons may remain visible on the touchscreen but not be responsive to a user's touch. Instead, the relative offset of a user's subsequent touches and/or cumulative gesture may be used to command the system, such as to navigate through a menu or call upon a desired application directly.

According to various embodiments, after a user toggles the touch-screen display 135*a* to receive relative offset commands (e.g., taps touch-screen display 135*a* three times), the generally selectable icons may disappear on the touchscreen. Then, the relative offset of a user's subsequent touches and/or cumulative gesture may be used to command the system, such as to navigate through a menu or call upon a desired application directly.

Figure 10D:
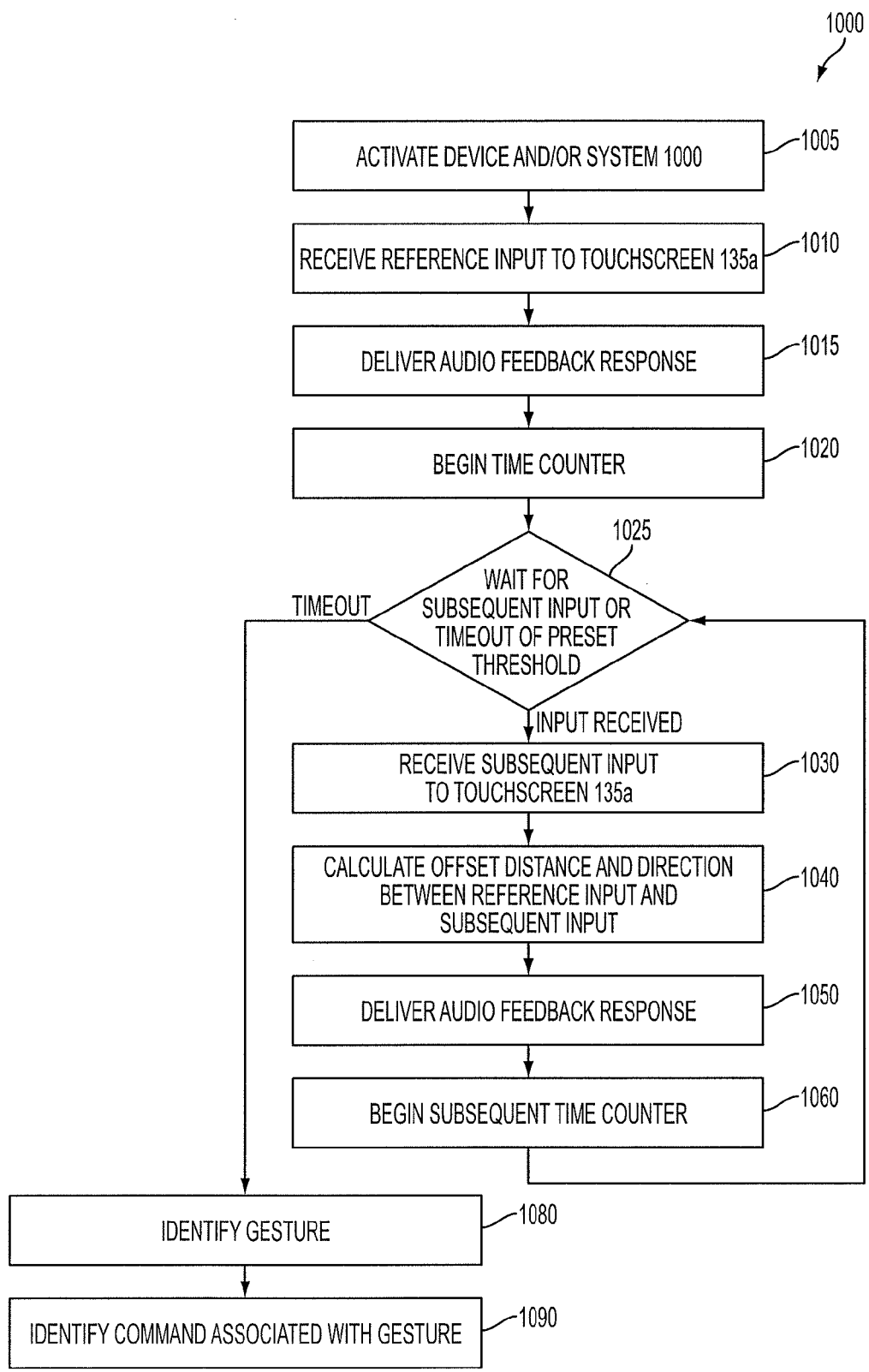
FIG. 10D is a flowchart for identifying comments associated with gesture using a touch-screen display of the intelligent mobility aid device according to an embodiment of the present invention.

According to various embodiments, and with reference to flow diagram of FIG. 10D, the distinct input may be any suitable input. For example, the distinct input to activate the system may be an initial touch and a hold for a period of time, a series of touches in the same location, or a distinct swipe or slide command, as shown in block 1005. Also, the system 1000 may be set in a ready mode and not involve an activation selection prior to a reference input being received.

Once activated, the system 1000 may receive a reference input via touch-screen display 135*a*, as shown in block 1010. As disclosed herein, this reference input may be at any location within the boundaries of touch-screen display 135*a*. Stated another way, this reference input may be at a random location. For example, a reference input may be at a first location during one use and at a second, different location during a second use. In response to receiving reference input, a timer may begin (1020). This timer may record the time it takes to receive a total series of inputs, the time between one or more inputs, and/or the time after an input without a subsequent input (1025). Substantially concurrently with receiving the reference input, system 1000 may deliver a feedback response (1015). This feedback response may be an audio feedback response. This audio feedback response may be any audio feedback, but is preferably a musical note or tone. Though it could be different, preferably the note is the same note for all initial reference inputs.

Subsequent to receiving the reference input, system 1000 may receive a subsequent input (1030). Substantially concurrently with receiving the subsequent input, system 1000 may deliver a feedback response (1050). In response to receiving subsequent input, a timer may begin (1060). System 1000 may calculate the relative x and relative y offset of the subsequent input as compared with a prior input, such as the reference input (1040). If enough time passes after a subsequent input, such as a threshold of time after a subsequent touch expiring, system 1000 will perceive the series of touches complete and associate and/identify a gesture with the received inputs (1025, 1080). In response to identifying a gesture, a command may be initiated by system (1090).

For instance, a subsequent input two units away from reference input may register as a different gesture or portion of a gesture as compared with a subsequent input one unit away from or three units away from a reference input. Similarly, a subsequent input two units away from reference input in a positive direction substantially along the x axis may register as a different gesture or portion of a gesture as compared with a subsequent input two units away from reference input in a negative direction substantially along the x axis.

As disclosed herein, a gesture may be made up of a series of touch, slides or a combination thereof. For instance and with renewed reference to FIGS. 10A-10B, by way of non-limiting example, a gesture may include a first tap at location 1, a second touch at location 2 and a third touch at location 3. A gesture may include a first tap at location 1, a second touch at location 2, an additional (repeated) touch at location 2 and a fourth touch at location 3. Also, for example, another gesture may include a first tap at location 1, a second touch at location 2 and a third touch at location 1. Additionally, a gesture may include a first tap at location 1 and a second touch at location 2 with a slide to location 3. This slide from location 2 to location 3 may be by any path and various paths may include distinct portions of gestures. For example, an "S" sliding motion from location 2 to location 3 may be registered as a distinct command by system 1000 as compared with a straight drag/slide in a direct path from location 2 to location 3. As will be appreciated, any sliding motion may be input by the system. Also, it is conceived that varying force of a touch or portions of a slide may result in a different portion of a gesture.

If the feedback provided is unexpected, a mechanism for starting over may be available. For instance, a certain input designated to erase a previous input and/or series of inputs, such as a double tap or circular slide.

Muscle memory and/or motor learning, which is a form of procedural memory that involves consolidating a specific motor task into memory through repetition may be involved in interaction with the system 1000. For instance, when a movement is repeated over time, such as inputting a gesture, a long-term muscle memory may be created for that task, eventually allowing it to be performed without conscious effort. This process decreases the need for attention and creates maximum efficiency within the motor and memory systems.

The order of performance of process in the illustrated blocks of FIGS. 2-10 may differ. Furthermore, two or more of the blocks may be performed simultaneously. For example, as the processor 111 analyzes certain data, the sensor array and/or the interface array may simultaneously detect data. Furthermore, if the processor 111 determines during the analysis that certain information is needed via a particular component, additional data may be detected.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device, point of sale device, personal digital assistant (e.g., an Android device, iPhone®, Blackberry®), cellular phone, kiosk, etc., online communications, satellite communications, off-line communications, wireless communications, transponder communications, local area network (LAN), wide area network (WAN), virtual private network (VPN), networked or linked devices, keyboard, mouse and/or any suitable communication or data input modality. Specific information related to the protocols, standards, and application software utilized in connection with the Internet is generally known to those skilled in the art and, as such, need not be detailed herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand.

Systems, methods and computer program products are provided. References to "various embodiments", in "some embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

The blocks of a method or algorithm described in connection with the examples disclosed herein may be embodied directly in hardware, in a software module executed by the processor 111, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium, such as the memory 112, is coupled to the processor 111 such that the processor 111 can read information from, and write information to, the storage medium. In the alternative, the storage medium may be integral to the processor 111. The processor 111 and the storage medium may reside in an Application Specific Integrated Circuit (ASIC).

The methods/systems may be described herein in terms of functional block components, screen shots, optional selections and various processing blocks. It should be appreciated that such functional blocks may be realized by any number of hardware and/or software components configured to perform the specified functions. For example, the methods/systems may employ various integrated circuit components, e.g., memory elements, processing elements, logic elements, look-up tables, and the like, which may carry out a variety of functions under the control of one or more microprocessors or other control devices. Similarly, the software elements of the methods/systems may be implemented with any programming or scripting language such as, VPL, C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and XML with the various algorithms being implemented with any combination of data structures, objects, processes, routines or other programming elements. Further, it should be noted that the methods/systems may employ any number of conventional techniques for data transmission, signaling, data processing, network control, and the like.

As will be appreciated by one of ordinary skill in the art, the methods/systems may be embodied as a customization of an existing system, an add-on product, upgraded software, a stand-alone system, a distributed system, a method, a data processing system, a device for data processing, and/or a computer program product. Furthermore, the methods/systems may take the form of a computer program product on a non-transitory computer-readable storage medium having computer-readable program code means embodied in the storage medium. Any suitable computer-readable storage medium may be utilized, including hard disks, CD-ROM, optical storage devices, magnetic storage devices, and/or the like.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. An intelligent guidance device, comprising:
    a plurality of wheels for travelling on a ground surface;
    a platform coupled to the plurality of wheels;
    an inertial measurement unit (IMU) coupled to the platform and configured to detect inertial measurement data corresponding to a positioning, a velocity, or an acceleration of the intelligent navigation device;
    a global position system (GPS) unit configured to detect location data corresponding to a location of the intelligent navigation device;
    a plurality of cameras coupled to the platform for detecting image data corresponding to a surrounding environment of the intelligent guidance device;
    a memory storing object data regarding previously determined objects and storing previously determined user data regarding a user of the intelligent guidance device;
    a processor connected to the IMU, the GPS unit, and the plurality of cameras, and configured to:
        proactively recognize an object in the surrounding environment by analyzing the image data based on the stored object data and at least one of the inertial measurement data or the location data,
        proactively determine a desirable event or action based on at least one of the recognized object, the previously determined user data, or a current time or day,
        proactively determine a destination based on the determined desirable event or action,
        proactively determine a navigation path for navigating the intelligent guidance device based on the determined destination, the image data, and at least one of the inertial measurement data or the location data, and
        proactively determine output data corresponding to the determined navigation path;
    a display for proactively displaying a first image based on the output data to provide visual information to the user based on the navigation path and proactively displaying a second image based on the determined desirable event or action; and
    a speaker for proactively providing first audio information to the user based on the output data and second audio information based on at least one of the recognized object or the determined desirable event or action.

2. The intelligent guidance device of claim 1, further comprising:

a left bar coupled and having a left grip;
a right bar coupled to the platform and having a right grip;
a first vibratory motor or actuator coupled to the left grip for providing first haptic information to the user based on the determined output data; and
a second vibratory motor or actuator coupled to the right grip for providing second haptic information to the user based on the determined output data.

3. The intelligent navigation device of claim 1, wherein the memory is configured to store map data, and the processor is configured to determine the navigation path based on the image data, the map data, and at least one of the location data or the inertial measurement data.

4. The intelligent navigation device of claim 1, further comprising:
a motor for driving the plurality of wheels, wherein the processor is further configured to control the motor to drive the plurality of wheels based on the determined navigation path.

5. The intelligent navigation device of claim 1, further comprising:
a left bar coupled to the platform and having a left grip;
a right bar coupled to the platform and having a right grip;
a first mechanical feedback unit having a rotatable or movable element proximal to the left bar,
a second mechanical feedback unit having a rotatable or movable element proximal to the right bar, wherein the processor is further configured to:
control the first mechanical feedback unit to provide a first feedback output based on the determined output data, and
control the second mechanical feedback unit to provide a second feedback output based on the determined output data, the second feedback output being different than the first feedback output.

6. The intelligent navigation device of claim 1, further comprising:
a wireless communication antenna for establishing an audio or video communication with another portable electronic device or computer used by another person, wherein the processor is further configured to establish the audio or video communication based on the determined desirable event or action.

7. The intelligent navigation device of claim 1, further comprising a microphone for detecting a speech of the user or another person, wherein the processor is further configured to:
parse a conversation of the user or the another person into speech elements,
analyze the parsed speech elements based on the previously determined user data, and
determine the desirable event or action further based on the analyzed speech elements.

8. The intelligent navigation device of claim 1, further comprising a battery coupled to the platform and capable of being wirelessly charged.

9. The intelligent navigation device of claim 1, further comprising:
a left bar coupled to the platform and having a left grip;
a right bar coupled to the platform and having a right grip;
a first electrical stimulation feedback unit positioned proximal to the left grip of the left bar; and
a second electrical stimulation feedback unit positioned proximal to the right grip of the right bar, wherein the processor is further configured to:
control the first electrical stimulation feedback unit to provide a first feedback output based on the determined output data, and
control the second electrical stimulation feedback unit to provide a second feedback output based on the determined output data, the second feedback output being different than the first feedback output.

10. The intelligent navigation device of claim 1, wherein the processor is further configured to determine terrain data regarding the surrounding environment based on the image data, the recognized object, and at least one of the inertial measurement data or the location data.

11. The intelligent navigation device of claim 10, wherein the processer is further configured to:
determine a maneuverability condition or a non-traversable area of the surrounding environment based on the image data, the recognized object, and at least one of the inertial measurement data or the location data, and
determine the navigation path based on the maneuverability condition or the non-traversable area of the surrounding environment for navigating the intelligent navigation device on safely traversable areas of the surrounding environment towards the determined destination.

12. The intelligent navigation device of claim 1, further comprising an encoder connected to the plurality of wheels and configured to detect data regarding a distance travelled by the intelligent navigation device or a travelling speed of the intelligent navigation device, and
wherein the processor is further configured to determine the location of the intelligent navigation device further based on the distance travelled by the intelligent navigation device or the travelling speed of the intelligent navigation device.

13. The intelligent navigation device of claim 1, wherein the plurality of cameras include:
a pair of stereo cameras for detecting depth information regarding the surrounding environment.

14. The intelligent navigation device of claim 1, wherein the plurality of cameras include an omnidirectional data for detecting the image data regarding the surrounding environment.

15. An intelligent guidance device controlled and operated by a user, comprising:
a plurality of wheels for travelling on a ground surface;
a platform coupled to the plurality of wheels;
a left bar having a left grip and being coupled to the platform;
a right bar having a right grip and being coupled to the platform;
a center bar connected between the left bar and the right bar;
a pair of stereo cameras mounted to the center bar for detecting images;
a memory storing predefined objects, previously determined user data regarding the user of the intelligent guidance device and previously detected data;
a processor coupled to the pair of stereo cameras and the memory and configured to:
proactively identify objects and distances to the objects using the detected images and the predefined objects;
proactively determine a desirable event or action based on at least one of the identified objects, the previously determined user data, or a current time or day,
proactively determine a destination based on the determined desirable event or action, proactively determine a navigation for navigating the intelligent guidance device based on the determined destination and the image data, and proactively determine output data corresponding to the determined navigation path a touch screen to proactively provide visual information regarding the objects and the distances to the objects;

a speaker to proactively provide first audio information based on the output data and second audio information regarding at least one of the determined desirable event or action, the objects or the distances to the objects;

a first vibratory motor coupled to the left grip for proactively providing haptics to navigate based on the determined output data; and a second vibratory motor coupled to the right grip for proactively providing haptics to navigate based on the determined output data.

16. The intelligence guidance device of claim 15, wherein the memory is configured to store map data, and the intelligence guidance device further comprises:

a global position system (GPS) unit; and an inertial measurement unit (IMU) for providing navigation guidance.

17. The intelligence guidance device of claim 15 further comprising an antenna coupled to the processor and configured for wireless communications.

18. The intelligence guidance device of claim 15 further comprising an omnidirectional camera coupled to the processor, wherein the processor is configured to identify the objects and the distances to the objects based on data detected from the pair of stereo cameras and the omnidirectional camera.

19. A method of operating an intelligent guidance device, comprising:

providing a plurality of wheels for travelling on a ground surface;

providing a platform coupled to the plurality of wheels;

providing a left bar coupled to the platform and having a left grip;

providing a right bar coupled to the platform and having a right grip;

detecting, using an inertial measurement unit (IMU) coupled to the platform, inertial measurement data corresponding to a positioning, a velocity, or an acceleration of the intelligent navigation device;

proactively detecting, using a global position system (GPS) unit, location data corresponding to a location of the intelligent navigation device;

proactively detecting, using a plurality of cameras coupled to the platform, image data corresponding to a surrounding environment of the intelligent guidance device;

storing, using a memory, object data regarding previously determined objects and previously determined user data regarding a user of the intelligent guidance device;

proactively recognizing, using a processor connected to the IMU, the GPS unit, and the plurality of cameras, an object in the surrounding environment by analyzing the image data based on the stored object data and at least one of the inertial measurement data or the location data;

proactively determining, using the processor, a desirable event or action based on at least one of the recognized object, the previously determined user data, or a current time or day;

proactively determining, using the processor, a destination based on the determined desirable event or action;

proactively determining, using the processor, a navigation path for navigating the intelligent guidance device to the destination based on the determined destination, the image data, and at least one of the inertial measurement data or the location data;

proactively determining, using the processor, output data based on the determined navigation path;

proactively displaying, using a display, an image based on the determined output data to provide visual information to the user based on at least one of the recognized object, the determined desirable event or action, or the navigation path; and proactively outputting, using a speaker, first audio information to the user based on the output data and second audio information based on at least one of the recognized object, the determined desirable event or action, or the navigation path.

20. The method of claim 19, further comprising:

outputting, using a first vibratory motor or actuator coupled to the left grip, first haptic information to the user based on the determined output data; and outputting, using a second vibratory motor or actuator coupled to the right grip, second haptic information to the user based on the determined output data.

* * * * *